(12) United States Patent
Kang et al.

(10) Patent No.: US 12,185,379 B2
(45) Date of Patent: Dec. 31, 2024

(54) METHOD FOR PERFORMING RANDOM ACCESS PROCEDURE IN WIRELESS COMMUNICATION SYSTEM AND APPARATUS THEREFOR

(71) Applicant: LG ELECTRONICS INC., Seoul (KR)

(72) Inventors: Jiwon Kang, Seoul (KR); Jonghyun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 605 days.

(21) Appl. No.: 17/594,380

(22) PCT Filed: Apr. 17, 2020

(86) PCT No.: PCT/KR2020/005145
§ 371 (c)(1),
(2) Date: Oct. 13, 2021

(87) PCT Pub. No.: WO2020/213977
PCT Pub. Date: Oct. 22, 2020

(65) Prior Publication Data
US 2022/0183072 A1   Jun. 9, 2022

Related U.S. Application Data

(60) Provisional application No. 62/836,132, filed on Apr. 19, 2019, provisional application No. 62/846,132, filed on May 10, 2019.

(51) Int. Cl.
*H04W 74/0833* (2024.01)
(52) U.S. Cl.
CPC .............................. *H04W 74/0833* (2013.01)

(58) Field of Classification Search
CPC .................................................. H04W 74/0833
USPC ............................................................ 370/329
See application file for complete search history.

(56) References Cited

U.S. PATENT DOCUMENTS

| | | | |
|---|---|---|---|
| 2016/0157267 A1* | 6/2016 | Frenne | H04W 16/28 370/329 |
| 2017/0331670 A1* | 11/2017 | Parkvall | H04W 52/0251 |
| 2021/0320821 A1* | 10/2021 | Lee | H04W 56/001 |

FOREIGN PATENT DOCUMENTS

| | | |
|---|---|---|
| KR | 1020180102515 | 9/2018 |
| KR | 1020190013624 | 2/2019 |
| KR | 1020190035633 | 4/2019 |
| WO | 2019051177 | 3/2019 |

OTHER PUBLICATIONS

PCT International Application No. PCT/KR2020/005145, International Search Report dated Aug. 13, 2020, 5 pages.

(Continued)

*Primary Examiner* — Sibte H Bukhari
(74) *Attorney, Agent, or Firm* — LEE, HONG, DEGERMAN, KANG & WAIMEY

(57) ABSTRACT

A method of performing, by a user equipment (UE), a random access procedure in a wireless communication system according to an embodiment of the present disclosure comprises transmitting a physical random access channel (PRACH) preamble, and receiving a random access response (RAR). The PRACH preamble is transmitted based on a specific unit, and the specific unit is related to a common property.

16 Claims, 17 Drawing Sheets

(56) References Cited

OTHER PUBLICATIONS

Huawei et al., "Discussion on timing advance and RACH procedures for NTN," 3GPP TSG RAN WG1 Meeting #96bis, R1-1904000, Apr. 2019, 7 pages.

* cited by examiner

[FIG. 1]
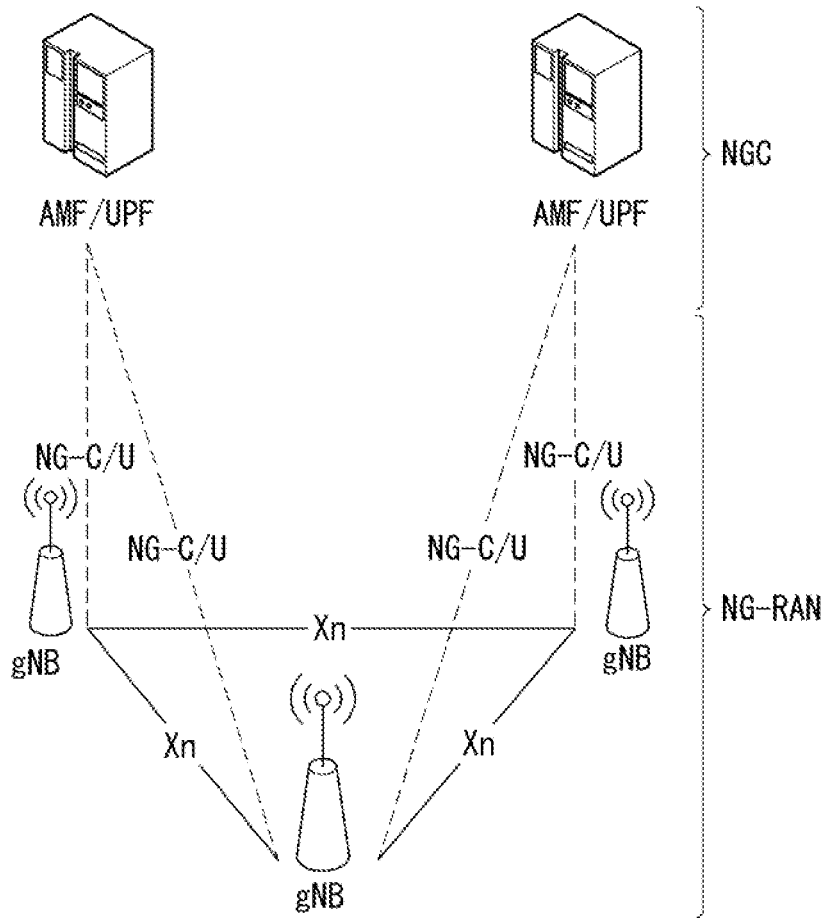
[FIG. 2]
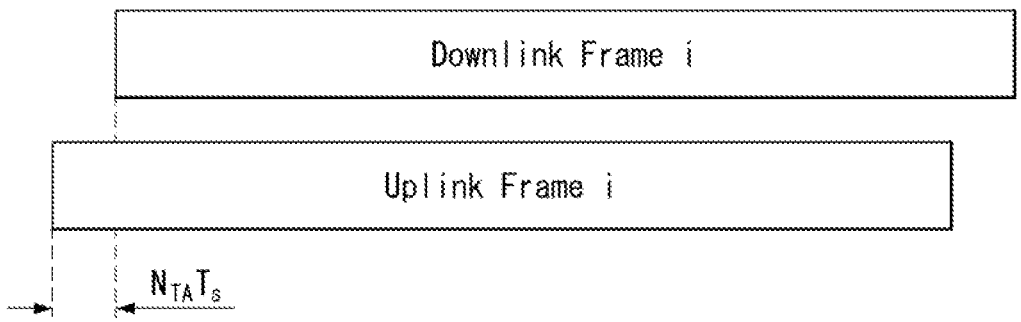

[FIG. 3]
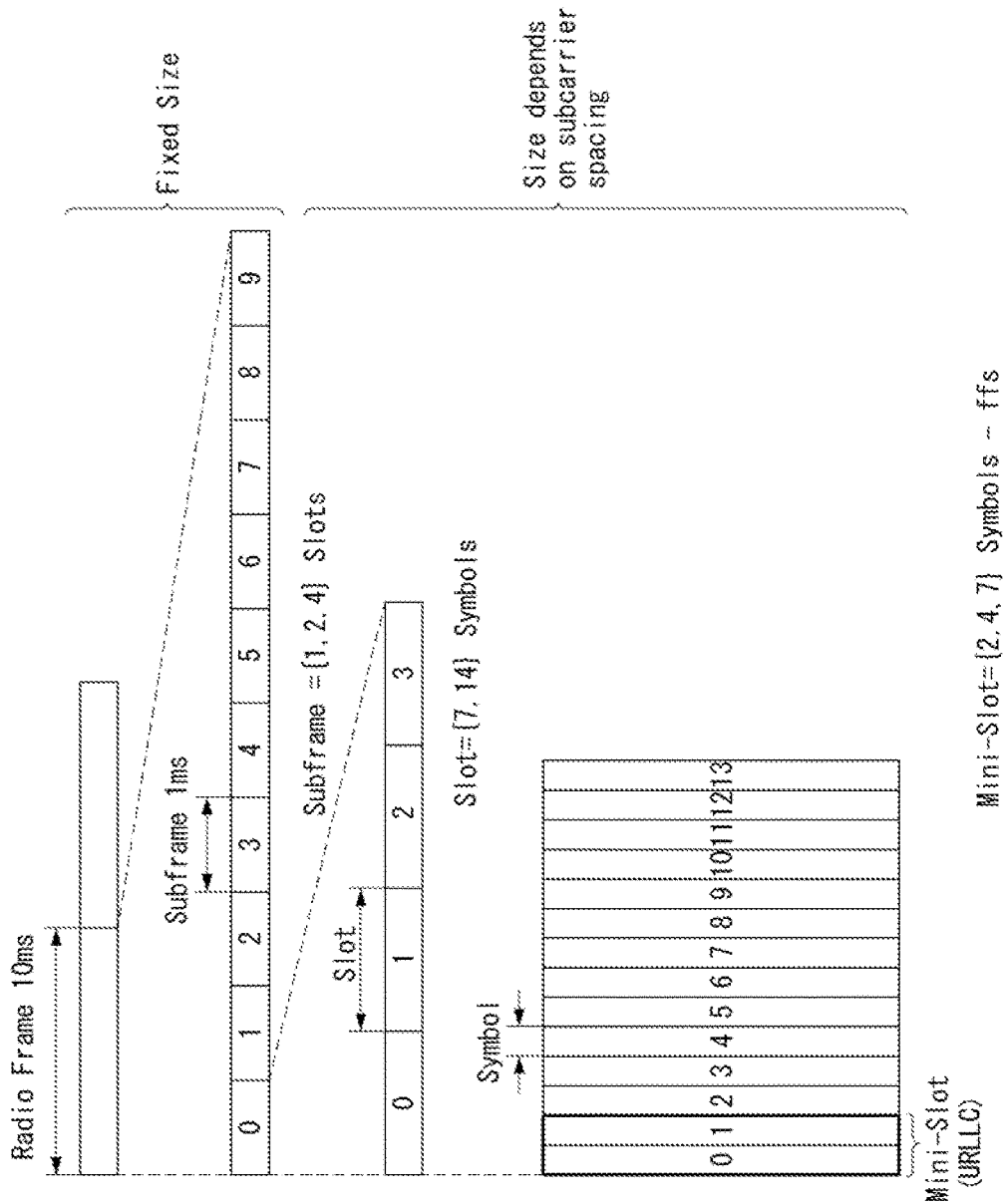

[FIG. 4]
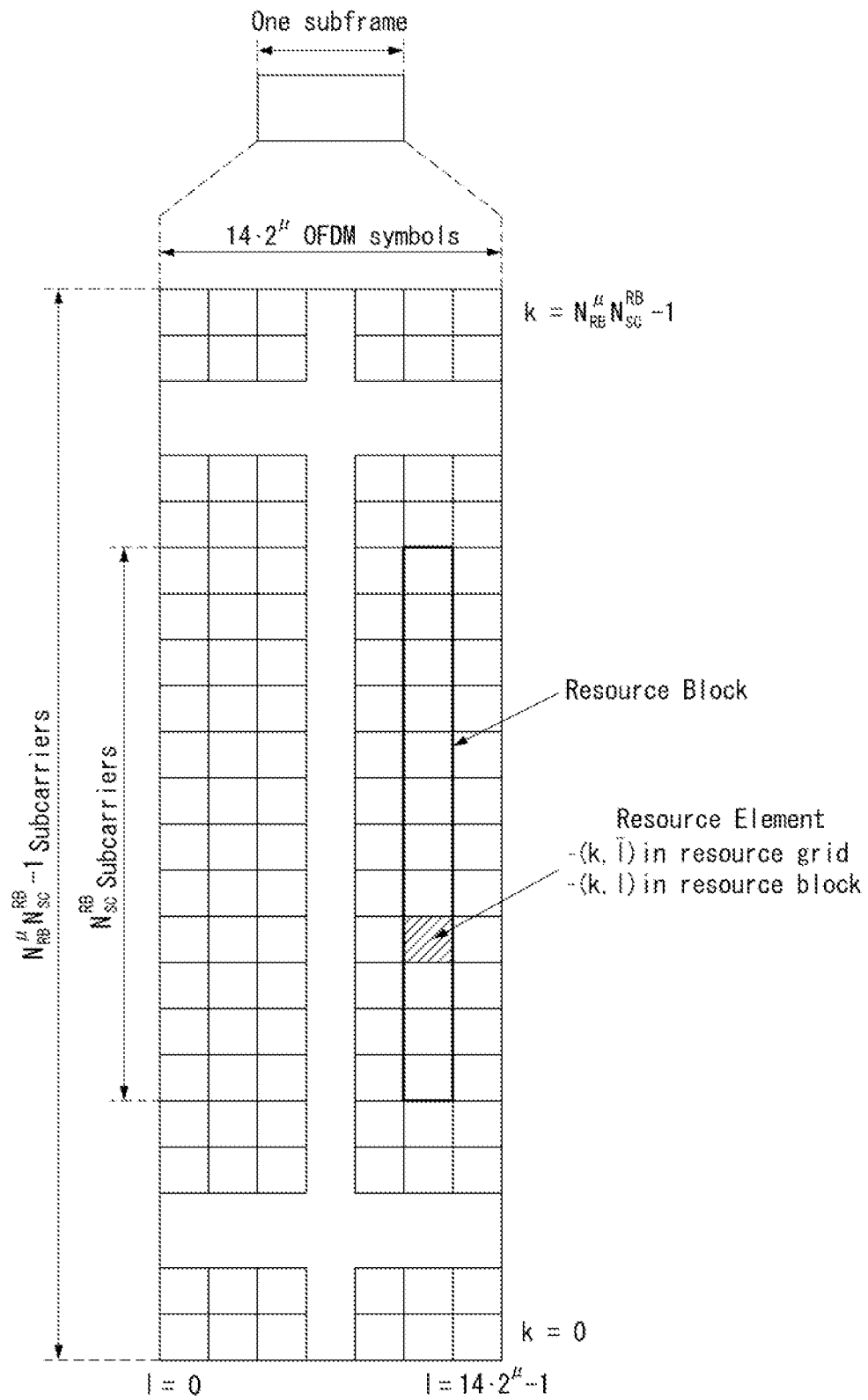

[FIG. 5]
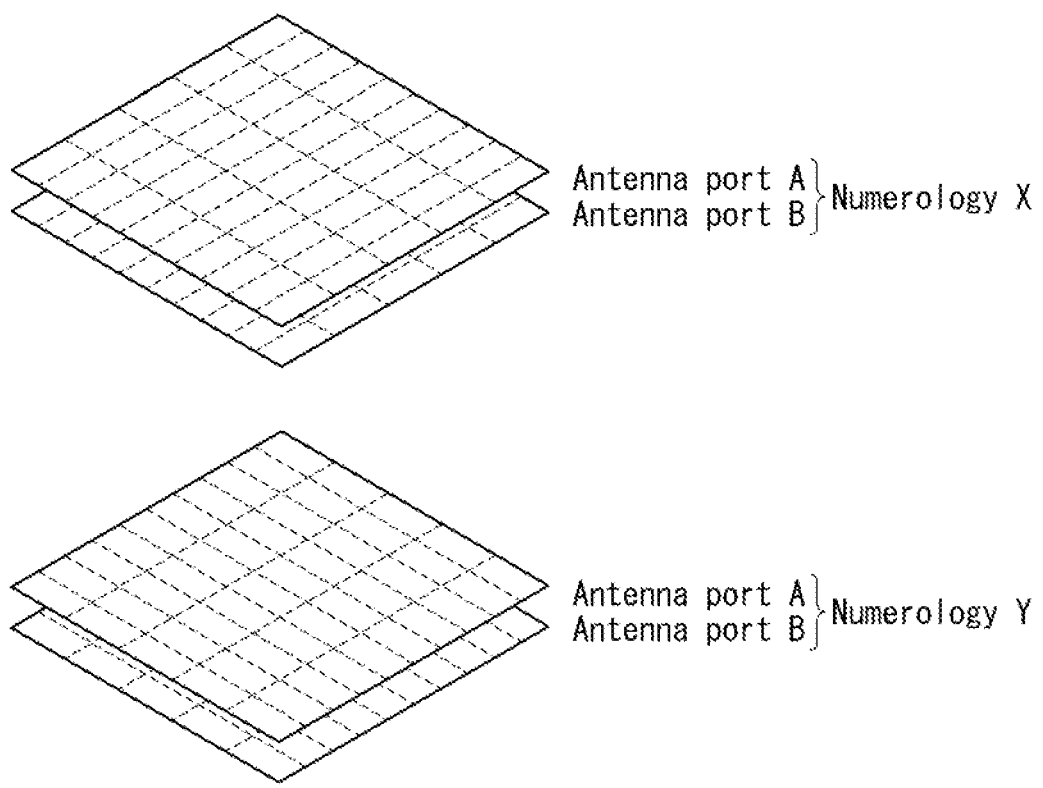

[FIG. 7]

| RACH slot | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| A1 | A1 | A1 | A1 | A1 | A1 | Null | | | | | | | |
| A1 | A1 | A1 | A1 | A1 | A1/B1 | | | | | | | | |
| B1 | B1 | B1 | B1 | B1 | B1 | | | | | | | | |
| A2 | | A2 | | A2 | | Null | | | | | | | |
| A2 | | A2 | | A2/B2 | | | | | | | | | |
| A3 | | | | A3 | | | | Null | | | | | |
| A3 | | | | A3/B3 | | | | | | | | | |
| B4 | | | | | | | | | | | | | |
| C0 | C0 | C0 | C0 | C0 | C0 | | | | | | | | |
| C2 | | | | C2 | | | | | | | | | |

(a) Starting OFDM symbol is '0'

| RACH slot | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| Null | A1 | A1 | A1 | A1 | A1 | A1 | A1 | | | | | | |
| Null | A1 | A1 | A1 | A1 | A1 | A1/B1 | | | | | | | |
| Null | B1 | B1 | B1 | B1 | B1 | B1 | | | | | | | |
| Null | A2 | | A2 | | A2 | | | | | | | | |
| Null | A2 | | A2 | | A2/B2 | | | | | | | | |
| Null | A3 | | | | A3 | | | | | | | | |
| Null | A3 | | | | A3/B3 | | | | | | | | |
| Null | B4 | | | | | | | | | | | | |
| Null | C0 | C0 | C0 | C0 | C0 | C0 | | | | | | | |
| Null | C2 | | | | C2 | | | | | | | | |

(b) Starting OFDM symbol is '2'

[FIG. 8]
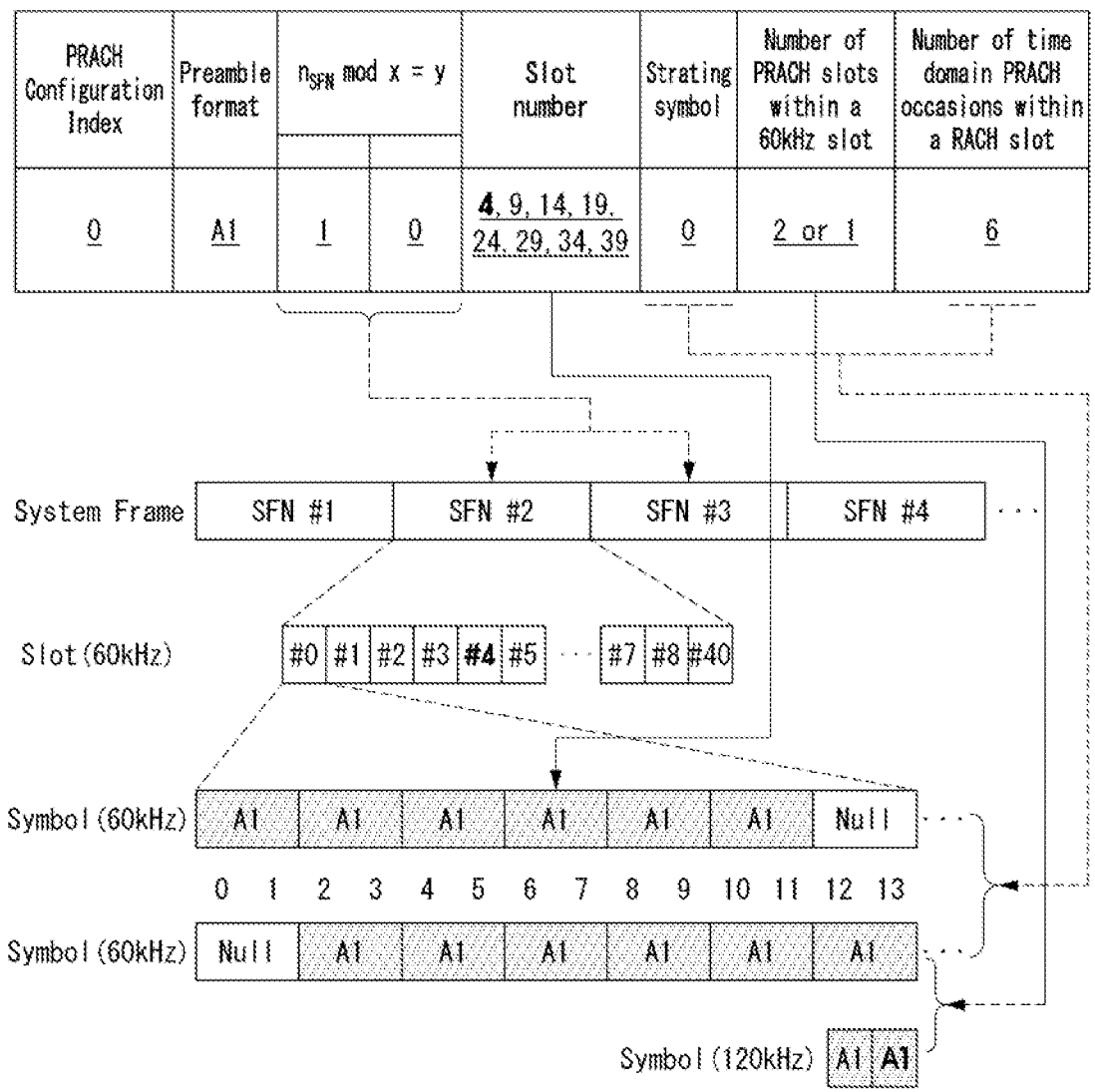

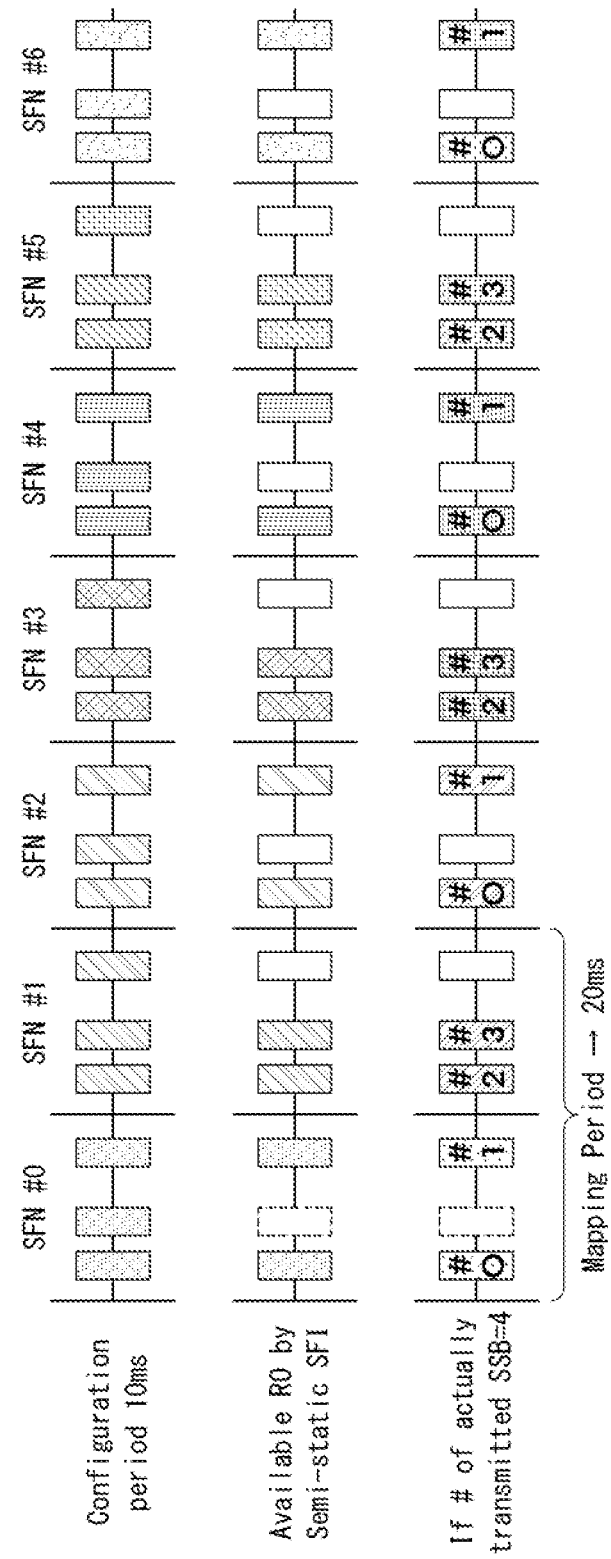
[FIG. 9]

[FIG. 10]
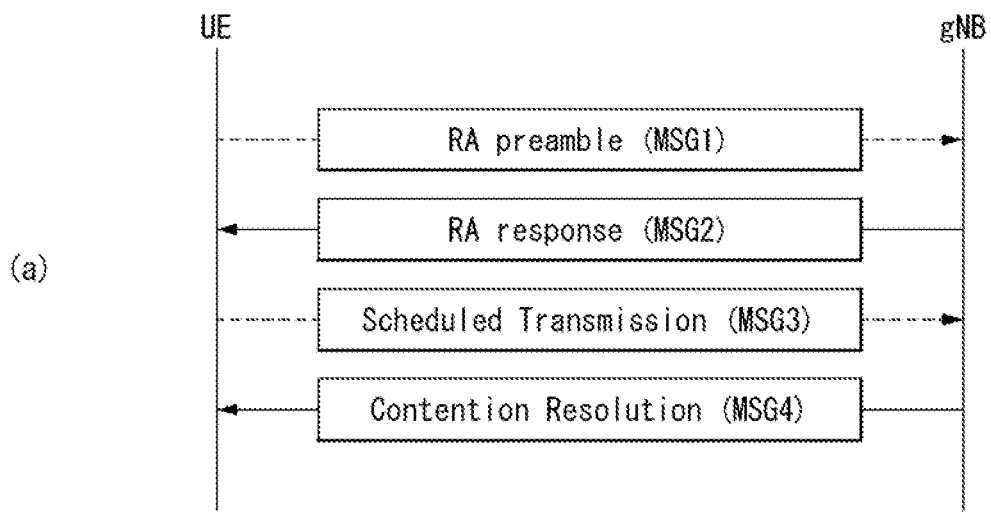
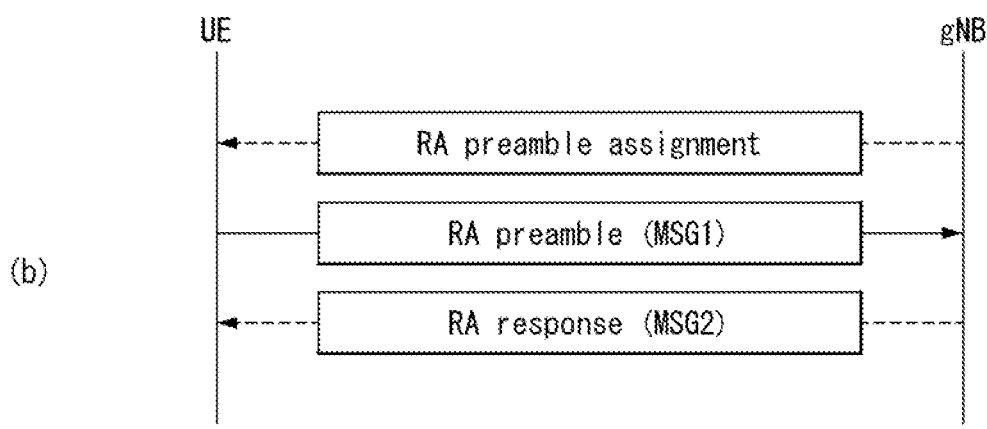

[FIG. 11]
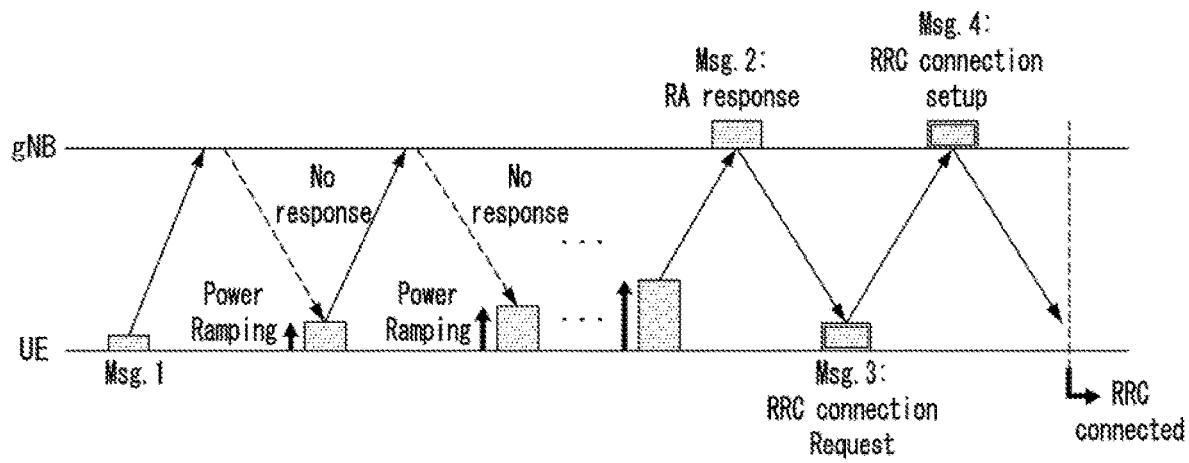
[FIG. 12]
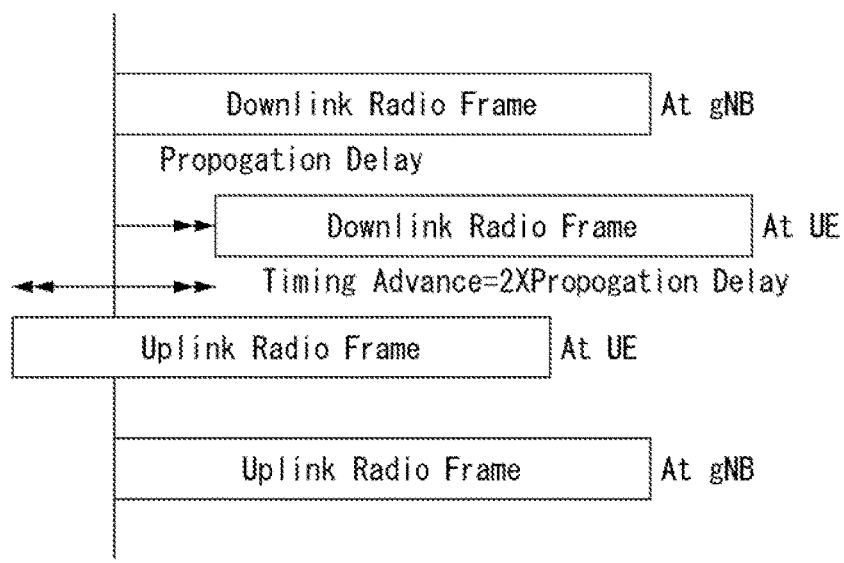

[FIG. 13]
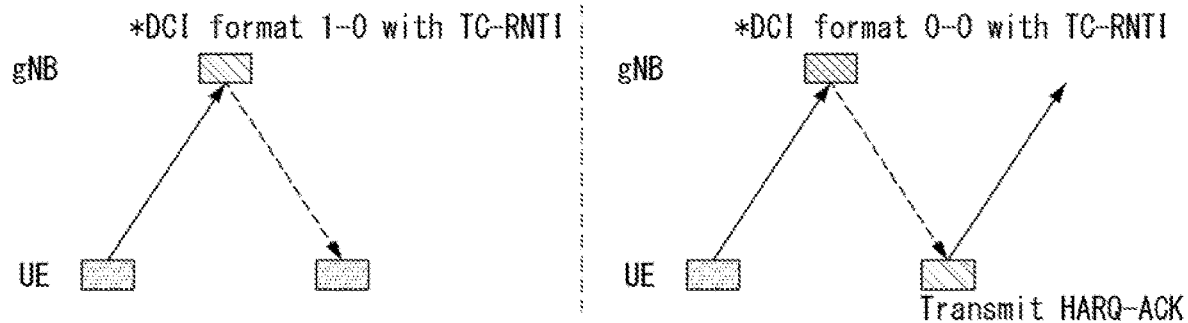
[FIG. 14]
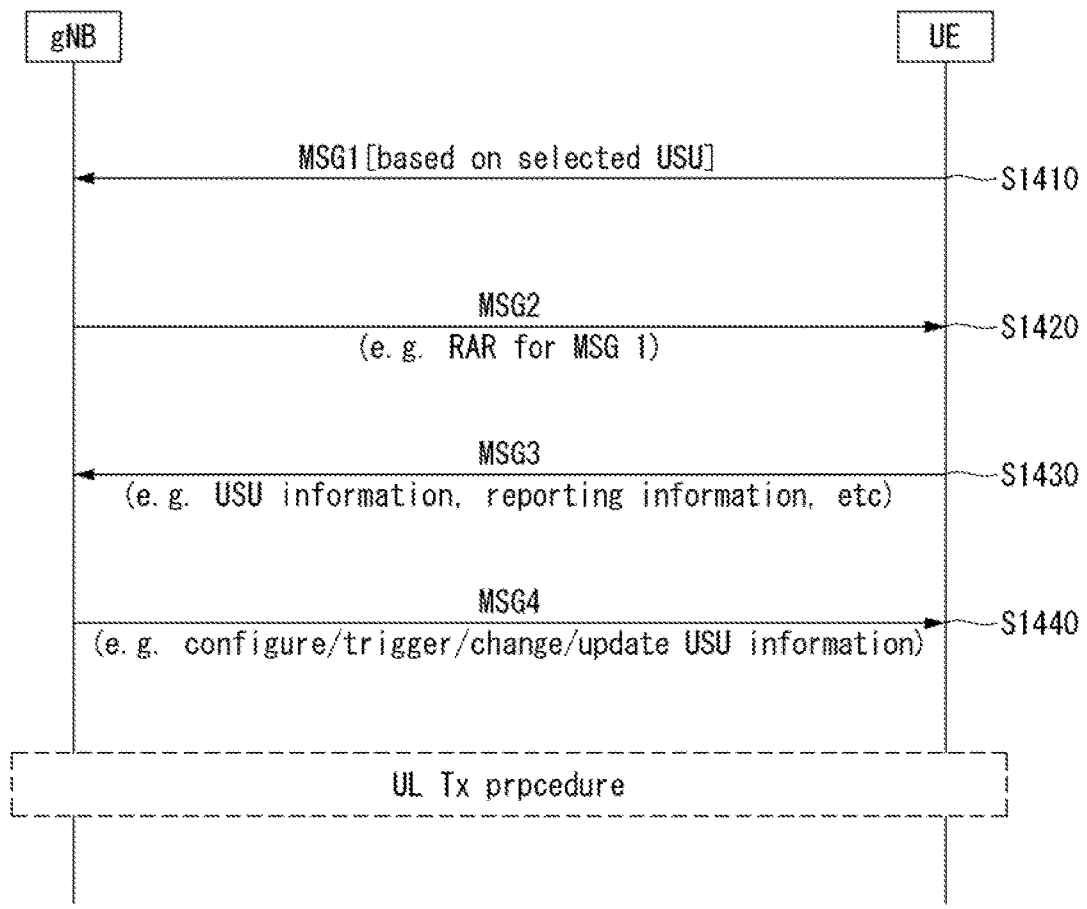

[FIG. 15]
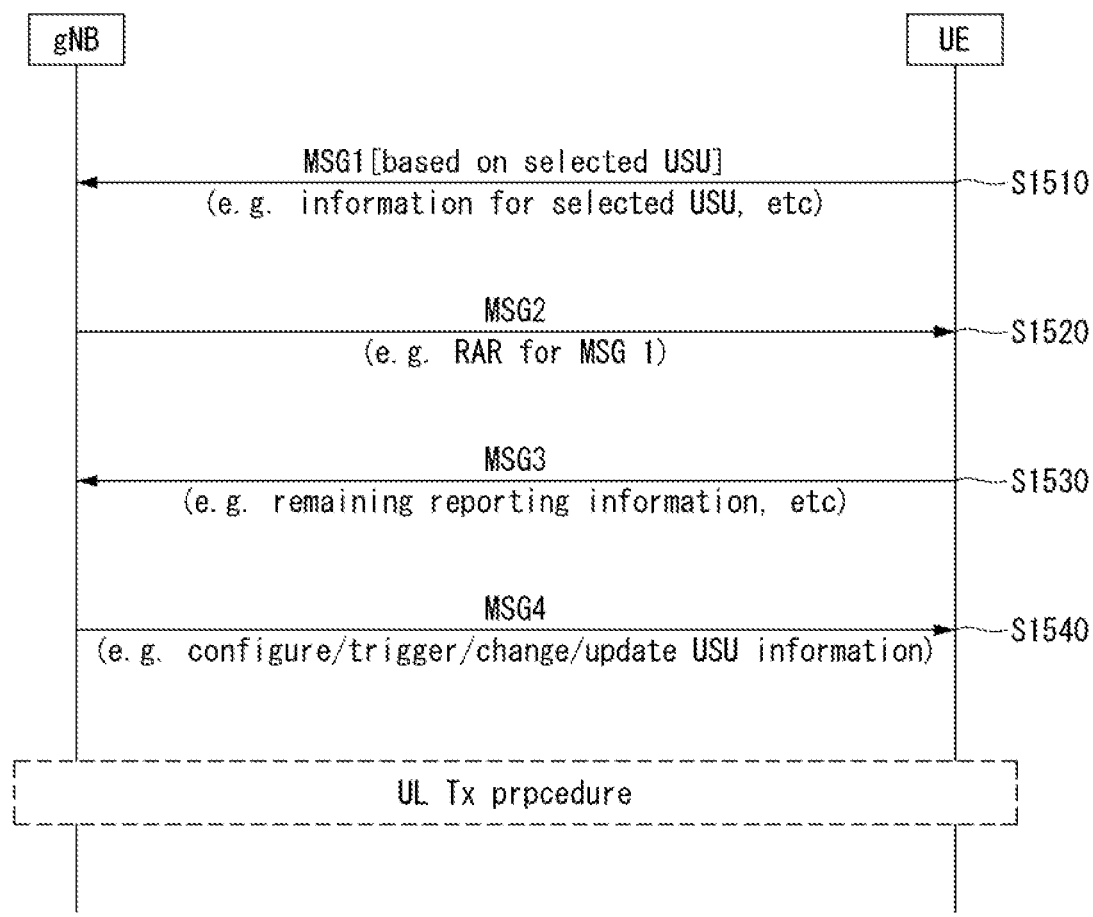

[FIG. 16]
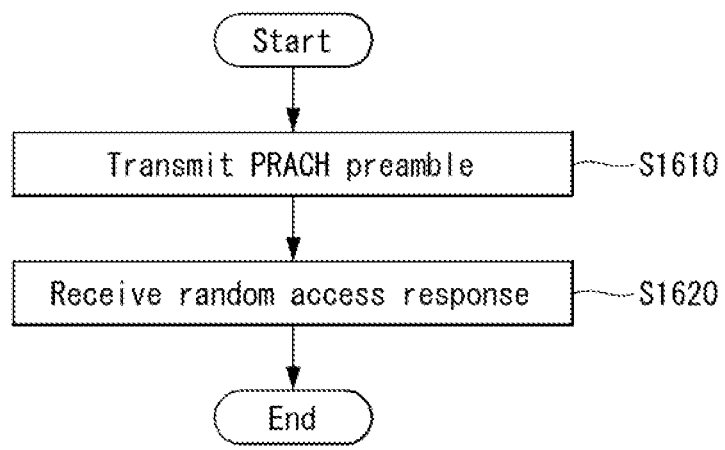
[FIG. 17]
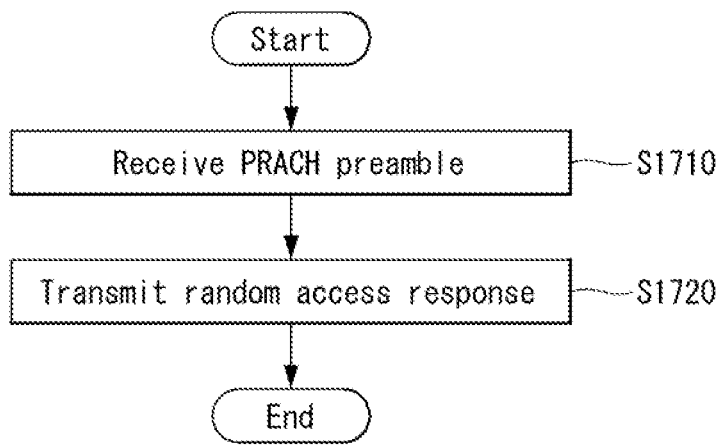

[FIG. 18]
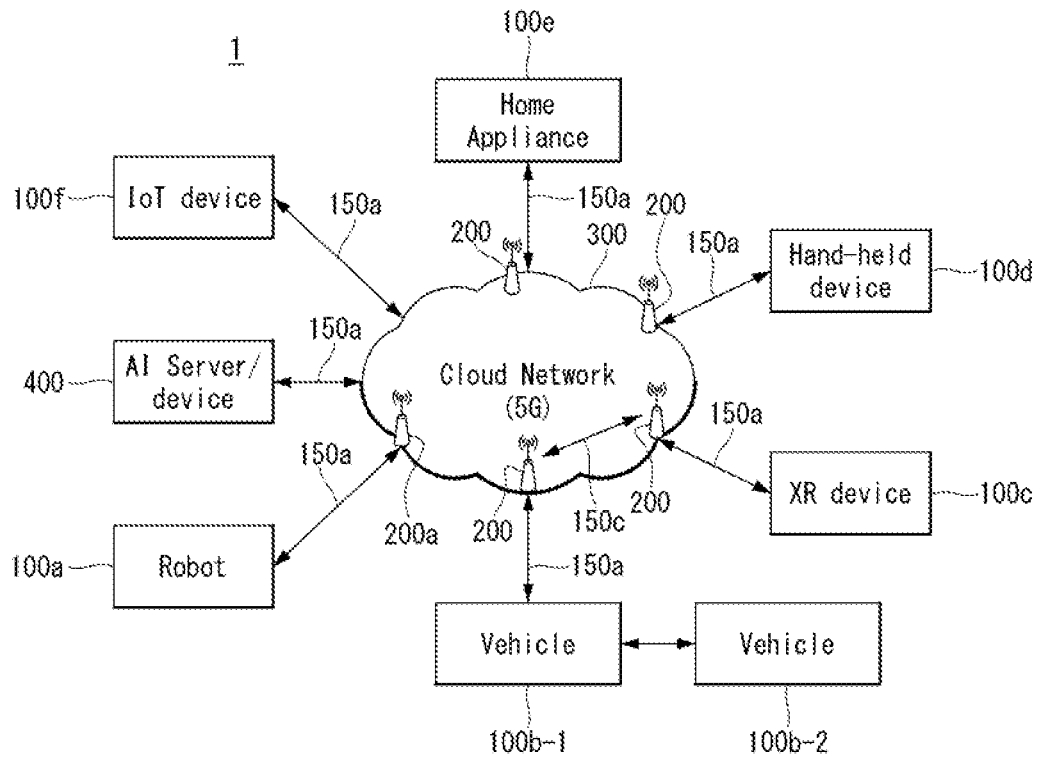
[FIG. 19]
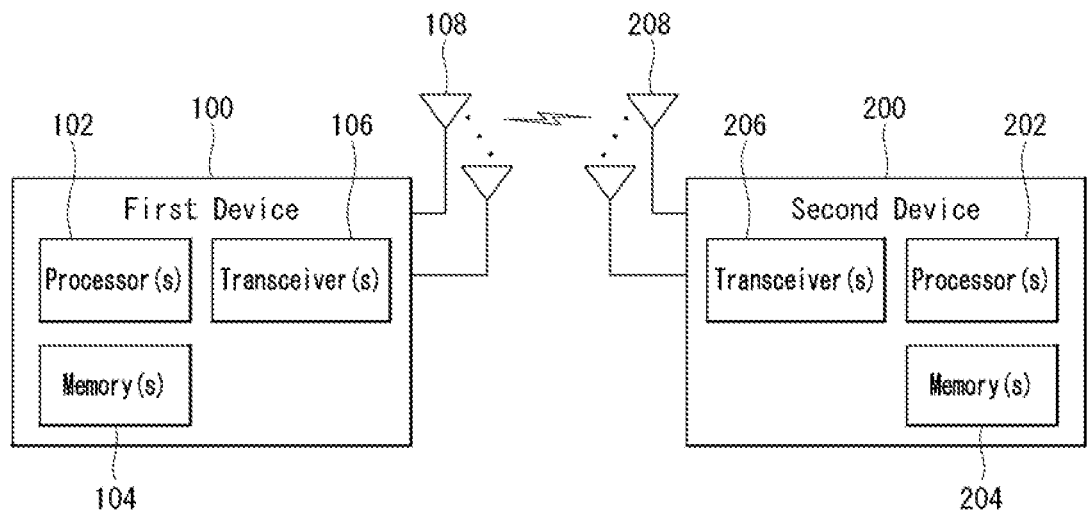

[FIG. 21]
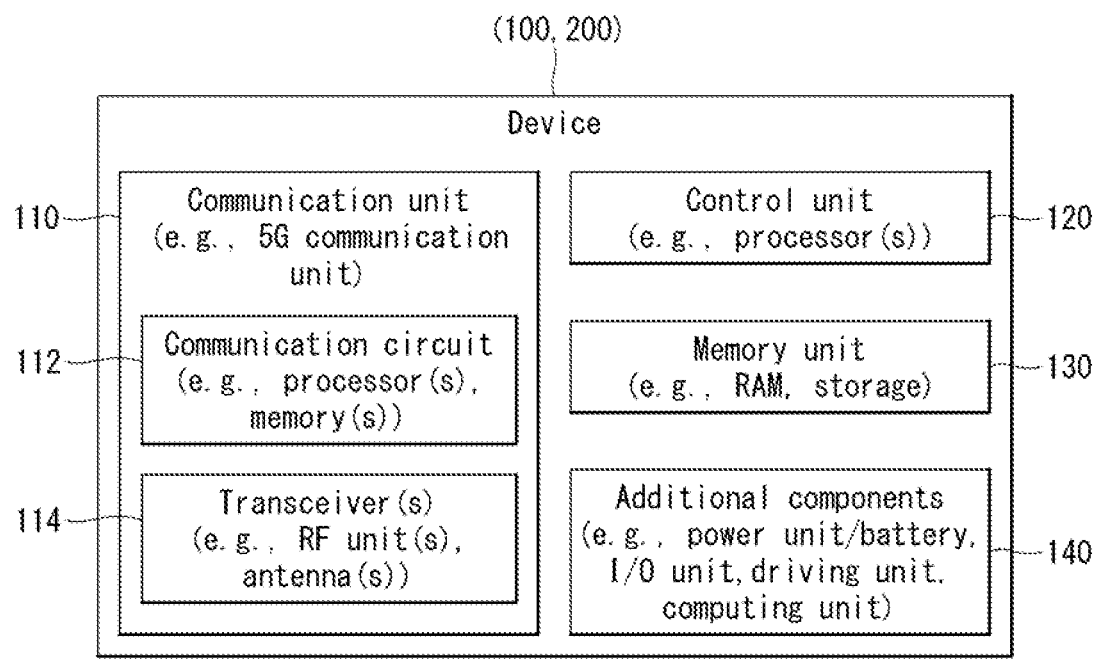

[FIG. 22]
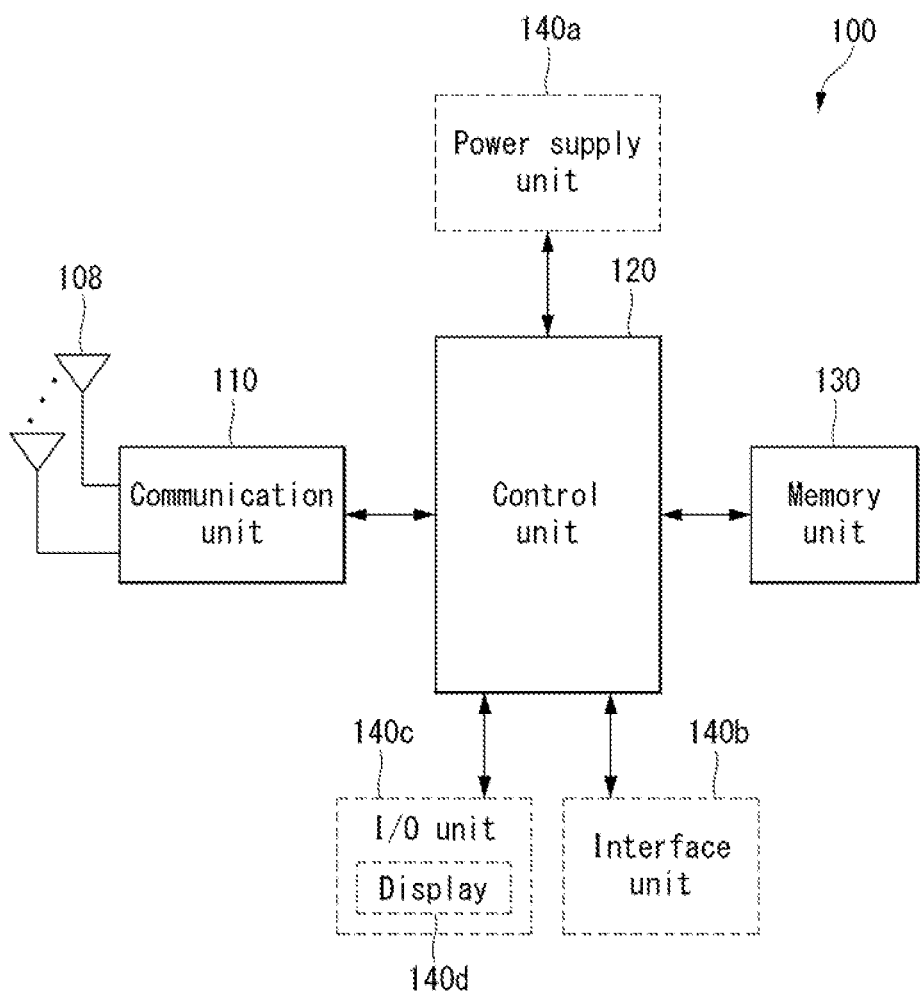

METHOD FOR PERFORMING RANDOM ACCESS PROCEDURE IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2020/005145, filed on Apr. 17, 2020, which claims the benefit of U.S. Provisional Application No. 62/836,132, filed on Apr. 19, 2019, and 62/842,624, filed on May 3, 2019, the contents of which are all incorporated by reference herein in their entirety.

TECHNICAL FIELD

The present disclosure relates to a method of performing a random access procedure in a wireless communication system and a device thereof.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure provides a method of performing a random access procedure of a multi-panel UE.

More specifically, the following problem may occur in a multi-panel UE. Fading characteristic may be different for each panel due to a location of each of panels that are geographically distributed, and timing synchronization may be problem since a delay occurs due to a difference in a cable length depending on the location of each panel. In addition, due to the use of a different hardware component for each panel, a difference in channel characteristic such as a phase noise, a frequency offset, and a timing offset may further increase.

Accordingly, the present disclosure provides a method of performing a random access procedure considering a difference in characteristics between panels due to a multi-panel.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

In one aspect of the present disclosure, there is provided a method of performing, by a user equipment (UE), a random access procedure in a wireless communication system, the method comprising transmitting a physical random access channel (PRACH) preamble, and receiving a random access response (RAR).

The PRACH preamble is transmitted based on a specific unit. The specific unit is based on one of i) at least one beam, ii) at least one panel of a plurality of panels of the UE, or iii) at least one antenna port related to the at least one panel. The specific unit is related to a common property.

The common property may include at least one of a timing advance (TA) or a transmission power control (TPC).

The common property may be related to a specific frequency domain, and the specific frequency domain may be based on a component carrier (CC) or a bandwidth part (BWP).

The method may further comprise transmitting UE capability information. The UE capability information may be related to a number of the specific units. The number of the specific units may be based on at least one of a total number (N) of the specific units or a maximum number (M) of the specific units that are able to be simultaneously applied.

Based on that the PRACH preamble is associated with a plurality of specific units, the specific unit for a transmission of the PRACH preamble may be determined based on association information. The association information may be based on an ID of the specific unit or mapping information between the specific unit and a radio network temporary identifier (RNTI).

Based on that the PRACH preamble is associated with a plurality of specific units, the specific unit for a transmission of the PRACH preamble may be determined based on association information. The association information may be related to at least one downlink reference signal (DLRS) associated with the plurality of specific units.

The PRACH preamble may be transmitted based on the M specific units.

The method may further comprise transmitting a third message (Msg3) based on the RAR, and receiving a contention resolution message (Msg4). The Msg3 may be transmitted based on the specific unit.

The PRACH preamble may be based on a plurality of PRACH preambles. The RAR may include one TA value of a plurality of TA values for the plurality of PRACH preambles. The Msg4 may include information for remaining TA values except for the TA value included in the RAR among the plurality of TA values.

The TA value included in the RAR may be based on at least one of i) a TA value applied to a transmission of the Msg3, ii) a TA value for one of a plurality of specific units for the plurality of PRACH preambles, or iii) a reference TA value for the remaining TA values.

The TA values included in the Msg4 may be a differential value with respect to the TA value included in the RAR.

The plurality of TA values may be adjusted by the same value based on a pre-configured command.

The PRACH preamble may be based on a plurality of PRACH preambles, and the Msg3 may include information related to a specific event. The specific event may be related to a configuration of a plurality of temporary cell-radio network temporary identifiers (TC-RNTIs).

The PRACH preamble or the Msg3 may include an ID of the specific unit used for a transmission of the PRACH preamble.

The ID of the specific unit may be based on a default ID. The default ID may be related to at least one of 1) a specific unit of a lowest index, 2) a specific unit used for a most recent uplink transmission, 3) a specific unit used for a most recent uplink transmission for a specific uplink channel, and 4) a specific unit related to a transmission configuration indicator (TCI) of a lowest control resource element (CORESET).

The ID of the specific unit is determined based on a mapping period between a SS block (SSB) and a RACH occasion (RO).

A quality of the panel and a quality of the SSB depending on the ID of the specific unit may be equal to or greater than a specific value.

In another aspect of the present disclosure, there is provided a user equipment (UE) performing a random access procedure in a wireless communication system, the UE comprising one or more transceivers, one or more processors, and one or more memories operatively connected to the one or more processors and configured to store instructions, that allow operations to be performed, when the random access procedure is executed by the one or more processors.

The operations comprise transmitting a physical random access channel (PRACH) preamble, and receiving a random access response (RAR).

The PRACH preamble is transmitted based on a specific unit. The specific unit is based on one of i) at least one beam, ii) at least one panel of a plurality of panels of the UE, or iii) at least one antenna port related to the at least one panel. The specific unit is related to a common property.

In another aspect of the present disclosure, there is provided a device comprising one or more memories and one or more processors operatively connected to the one or more memories.

The one or more processors are configured to allow the device to transmit a physical random access channel (PRACH) preamble, and receive a random access response (RAR).

The PRACH preamble is transmitted based on a specific unit. The specific unit is based on one of i) at least one beam, ii) at least one panel of a plurality of panels, or iii) at least one antenna port related to the at least one panel. The specific unit is related to a common property.

In another aspect of the present disclosure, there are provided one or more non-transitory computer readable mediums (CRMs) storing one or more commands.

The one or more commands executable by one or more processors are configured to allow a user equipment (UE) to transmit a physical random access channel (PRACH) preamble, and receive a random access response (RAR).

The PRACH preamble is transmitted based on a specific unit. The specific unit is based on one of i) at least one beam, ii) at least one panel of a plurality of panels, or iii) at least one antenna port related to the at least one panel. The specific unit is related to a common property.

Advantageous Effects

According to an embodiment of the present disclosure, a physical random access channel (PRACH) preamble is transmitted based on a specific unit related to a common property. The specific unit may be based on one of i) at least one beam, ii) at least one of a plurality of panels of a UE, or iii) at least one antenna port related to the at least one panel. That is, a random access procedure is performed based on the panel/beam/antenna port having the common property.

Accordingly, a random access procedure of a multi-panel UE can be performed so that a difference in channel property between the panels and a difference in other properties are minimized, and thus reliability of the procedure can be secured.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 7 illustrates an example of start OFDM symbols related to RACH slots.

FIG. 8 illustrates an example of an RACH configuration table.

FIG. 9 is a diagram illustrating an example of RACH configuration intervals and mapping interval sets.

FIG. 10 is a diagram illustrating an RACH procedure.

FIG. 11 illustrates an example of an overall RACH procedure.

FIG. 12 is a diagram illustrating an example of TA.

FIG. 13 illustrates an example of the retransmission of MSG3 and MSG4 transmission.

FIG. 14 is a flow chart illustrating an example of a signaling procedure according to an embodiment of the present disclosure.

FIG. 15 is a flow chart illustrating another example of a signaling procedure according to an embodiment of the present disclosure.

FIG. 16 is a flow chart illustrating a method for a UE to perform a random access procedure in a wireless communication system according to an embodiment of the present disclosure.

FIG. 17 is a flow chart illustrating a method for a base station to perform a random access procedure in a wireless communication system according to another embodiment of the present disclosure.

FIG. 18 illustrates a communication system 1 applied to the present disclosure.

FIG. 19 illustrates wireless devices applicable to the present disclosure.

FIG. 21 illustrates another example of a wireless device applied to the present disclosure.

FIG. 22 illustrates a hand-held device applied to the present disclosure.

MODE FOR INVENTION

Figure 6:
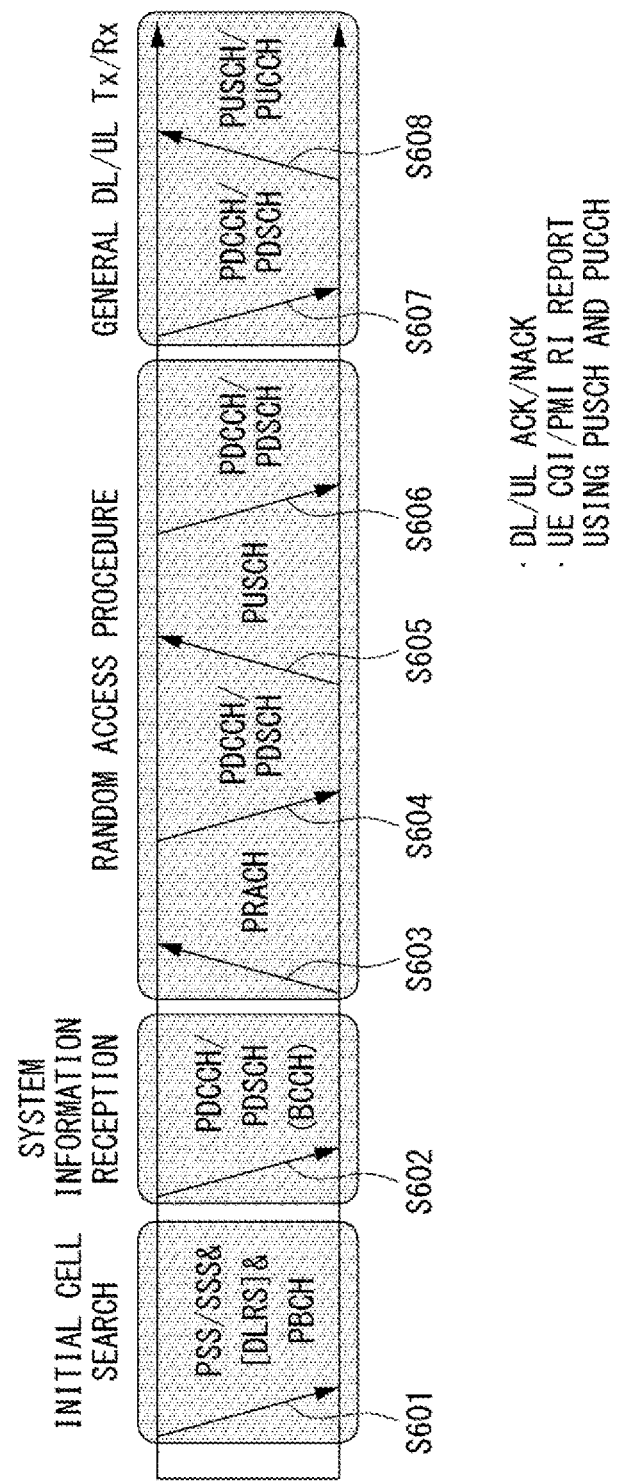
FIG. 6 illustrates physical channels and general signal transmission used in a 3GPP system.

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max} \cdot N_f)$, where $\Delta f_{max}=480 \cdot 10^3$, and $N_f=4096$. Downlink and uplink transmissions is constituted of a radio frame with a period of $T_f=(\Delta f_{max} N_f/100) \cdot T_s=10$ ms. Here, the radio frame is constituted of 10 subframes each of which has a period of $T_{sf}=(\Delta f_{max} N_f/1000) \cdot T_s=1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $n_s^\mu \in \{0, \ldots, N_{subframe}^{slots,\mu}-1\}$ in the subframe and in ascending order of $n_{s,f}^\mu \in \{0, \ldots, N_{frame}^{slots,\mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu} N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$, $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k, l̄), where k=0, . . . , $N_{RB}^{\mu} N_{sc}^{RB}-1$ is an index on a frequency domain, and l̄=0, . . . , $2^{\mu} N_{symb}^{(\mu)}-1$ refers to a location of a symbol in a subframe. The index pair (k, l̄) is used to refer to a resource element in a slot, where l=0, . . . , $N_{symb}^{\mu}-1$.

The resource element (k, l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

PRACH Design and RA Procedure in NR

The following description relates to briefly summarized contents for the PRACH design of a random access procedure and a 3GPP NR system, and may be different from an accurate design of NR and a simultaneous design.

An accurate design may be slightly different for each release and for each version, and is described in 3GPP TS 38.211, TS 38.212, tS 38.213, TS 38.214, tS 38.321, TS 38.331.

Physical Random Access Channel (PRACH) Design

First, the principle of a PRACH design is described.
Support beam-based PRACH preamble transmission and reception
Support both FDD and TDD frame structures
Provide a dynamic cell range (a maximum 100 km)
Support a high-speed vehicle (e.g., a maximum 500 km/h)
Support a wide frequency range (e.g., a maximum 100 GHz)
Next, a sequence for a PRACH preamble is described.
ZC sequence
Provide an excellent cross-correlation characteristic and a low PAPR/CM
Sequence having two lengths for a PRACH preamble in NR
a long preamble sequence (L=839)
(Use Case) used for only LTE coverage, a high-speed case/FR1
a short preamble sequence (L=139)

A multi-beam scenario is supported, and a TDD frame structure/preamble is arranged with an OFDM symbol boundary/used for both FR1 and FR2

In the case of FR1, support subcarrier spacing of 15 kHz and 30 kHz

In the case of FR2, support subcarrier spacing of 60 kHz and 120 kHz.

Table 5 below illustrates an example of a long sequence-based PRACH preamble, and relates to long preamble formats (LRA=839, subcarrier spacing={1.25, 5} kHz).

TABLE 5

| Format | SCS | TCP(Ts) | TSEQ(Ts) | TGP(Ts) | Use Case |
|---|---|---|---|---|---|
| 0 | 1.25 kHz | 3168k | 24576k | 2976k | LTE coverage |
| 1 | 1.25 kHz | 21024k | 2 · 24576k | 21984k | Large cell, Lip to 100 km |
| 2 | 1.25 kHz | 4688k | 4 · 24576k | 19888k | Related |
| 3 | 5 kHz | 3168k | 4 · 6144k | 2976k | High speed |

Table 6 below illustrates an example of a short sequence-based PRACH preamble, and relates to short preamble formats (LRA=139, subcarrier spacing={15, 30, 60, 120} kHz).

TABLE 6

| Format | # of Sequence | TCP | TSEQ | TGP | Path profile (Ts) | Path profile (us) | Maximum Cell radius (meter) |
|---|---|---|---|---|---|---|---|
| A | 1 | 288 k · $2^{-\mu}$ | 2.2048 k · $2^{-\mu}$ | 0 k · $2^{-\mu}$ | 96 | 3.13 | 938 |
|   | 2 | 576 k · $2^{-\mu}$ | 4.2048 k · $2^{-\mu}$ | 0 k · $2^{-\mu}$ | 144 | 4.69 | 2,109 |
|   | 3 | 864 k · $2^{-\mu}$ | 6.2048 k · $2^{-\mu}$ | 0 k · $2^{-\mu}$ | 144 | 4.69 | 3,516 |
| B | 1 | 216 k · $2^{-\mu}$ | 2.2048 k · $2^{-\mu}$ | 72 k · $2^{-\mu}$ | 72 | 3.13 | 469 |
|   | 2 | 360 k · $2^{-\mu}$ | 4.2048 k · $2^{-\mu}$ | 216 k · $2^{-\mu}$ | 144 | 4.69 | 1,055 |
|   | 3 | 504 k · $2^{-\mu}$ | 6.2048 k · $2^{-\mu}$ | 360 k · $2^{-\mu}$ | 144 | 4.69 | 1,758 |
|   | 4 | 936 k · $2^{-\mu}$ | 12.2048 k · $2^{-\mu}$ | 792 k · $2^{-\mu}$ | 144 | 4.69 | 3,867 |
| C | 0 | 1240 k · $2^{-\mu}$ | 2048 k · $2^{-\mu}$ | 1096 k · $2^{-\mu}$ | 144 | 4.69 | 5300 |
|   | 2 | 2048 k · $2^{-\mu}$ | 4.2048 k · $2^{-\mu}$ | 2912 k · $2^{-\mu}$ | 144 | 4.69 | 9200 |

An RACH slot is described below.
An RACH slot includes one or multiple RACH Occasion(s).

Slot duration is 1 ms for {1.25 kHz, 5 kHz} subcarrier spacing, and has scalable duration (i.e., 1 ms, 0.5 ms, 0.25 ms, 0.125 ms) for {15 kHz, 30 kHz, 60 kHz, 120 kHz} subcarrier spacing.

A start OFDM symbol index in an RACH slot has {0,2,x} values for short preamble formats.

FIG. 7 illustrates an example of start OFDM symbols related to RACH slots. Specifically, (a) of FIG. 7 illustrates a case where the start OFDM symbol is '0', and (b) of FIG. 7 illustrates a case where the start OFDM symbol is '2.'

An RACH configuration table is described below.

Multiple tables may be defined based on a frequency range and a duplex scheme.
FDD and FR1 (for both long preamble and short preamble formats)

TDD and FR1 (for both long preamble format and short preamble format)

TDD and FR2 (for only a short preamble format)

FIG. 8 illustrates an example of an RACH configuration table.

The association of an SSB and an RACH occasion is described.

A time interval from SSB to RO association

The smallest value of a set determined by an RACH configuration

All of actually transmitted SSBs may be mapped to ROs within a time interval at least once.

Table 7 below is a table illustrating an example of RACH configuration intervals and mapping interval sets, and FIG. 9 is a diagram illustrating an example of RACH configuration intervals and mapping interval sets.

TABLE 7

| RACH configuration period (ms) | Mapping Period set (# of RACH configuration period) |
|---|---|
| 10 | {1, 2, 4, 8, 16} |
| 20 | {1, 2, 4, 8} |
| 40 | {1, 2, 4} |
| 80 | {1, 2} |
| 160 | {1} |

Random Access (RA) Procedure

RA may be triggered by several events.

Initial access in RRC_IDLE

RRC connection re-establishment procedure

Handover

If an UL synchronization state is 'asynchronization', DL or UL data arrival during RRC_CONNECTED Transition in RRC_INACTIVE Another system information (SI) request Beam failure recovery Two types of RACH procedures in NR are described with reference to FIG. 10.

(a) of FIG. 10 is a contention-based RACH procedure, and (b) of FIG. 10 is a contention-free RACH procedure.

FIG. 11 illustrates an example of an overall RACH procedure.

First, MSG1 transmission is described.

Subcarrier spacing for MSG1 is configured in an RACH configuration, and is provided in a handover command with respect to a contention-free RA procedure for handover.

Preamble indices for contention-based random access (CBRA) and contention-free random access (CFRA) are consecutively mapped to one SSB in one RACH transmission occasion.

CBRA

Association between an SS block (SSB) within an SS burst set and a subset of RACH resources and/or preamble indices is configured by a parameter set in an RMSI.

CFRA

A UE may be configured transmit multi-MSG1s through a dedicated multi-RACH transmission occasion in the time domain before the end of a monitored RAR window.

Furthermore, association between a CFRA preamble and an SSB is reconfigured through UE-specific RRC.

Next, a random access response (MSG2) configuration is described.

Subcarrier spacing (SCS) for MSG2 is the same as the SCS of remaining minimum SI (RMSI).

Furthermore, the SCS is provided in a handover command with respect to a contention-free RA procedure for handover.

Furthermore, MSG2 is transmitted within a UE minimum DL BW.

The size of a RAR window is the same for all RACH opportunities, and is configured in the RMSI.

A maximum window size: depends on the worst gNB latency after Msg1 reception including processing delay, scheduling delay, etc.

A minimum window size: depends on duration of Msg2 or CORESET and scheduling latency Next, a timing advance (TA) command in MSG2 is described.

This is used to control uplink signal transmission timing.

First, in the case of LTE,

TA resolution is 16 Ts (Ts=1/(2048×15000)).

A TA range uses 1282×TA step size~667.66.→100.16

In an RAR, a timing advance (TA) has values from 0 to 1,282, and set to 11 bits.

In the case of NR,

In TR38.913, this is used in a very long coverage (150 Km~300 Km).

A TA increase in 2,564 or 3,846 TA step (12 its)

FIG. 12 is a diagram illustrating an example of TA.

RA-RNTI

RA_RNTI is determined by a UE by transmitting timing of a PRACH Preamble.

That is, RA_RNTI may be determined by Equation 3 below.

$$RA\_RNTI = 1 + s\_id + 14 * t\_id + 14 * X * f\_id + 14 * X * Y * ul\_carrier\_id \quad \text{[Equation 3]}$$

In Equation 3, s_id indicates the first OFDM symbol index (0≤s_id<14), t_id indicates the first slot index in a system frame (0≤t_id<X), X is fixed 80 for 120 kHz SCS, f_id indicates a frequency domain index (0≤f_id<Y), Y is fixed 8 for a maximum #n of FDMed ROs, and ul_carrier_id indicates an indication of an UL carrier (0:normal, 1:SUL).

A minimum gap between MSG2 and MSG3 is duration of N1+duration of N2+L2+TA.

In this case, N1, N2 are front loaded+additional DMRS and a UE capability, L2 is a MAC process latency (500 us), and TA is the same as a maximum timing advance value.

If MSG2 does not include a response to a transmitted preamble sequence, a new preamble sequence is transmitted after duration of N1+Δnew+L2.

Table 8 illustrates an example of a DCI format 1-0 having an RA-RNTI.

TABLE 8

| Field | Bits | Comment |
|---|---|---|
| Identifier for DCI formats | 1 | Reserved |
| Frequency domain resource assignment | | |
| Time domain resource assignment | X | Defined in Subclause 5.1.2.1 of TS 38.214 |
| VRB-to-PRB mapping | 1 | |
| Modulation and coding scheme | 5 | Use MCS table without 256QAM (UE capabilities not yet known) |
| New data indicator | 1 | Reserved |
| Redundancy version | 2 | Reserved |
| HARQ process number | 4 | Reserved |

TABLE 8-continued

| Field | Bits | Comment |
|---|---|---|
| Downlink assignment index | 2 | Reserved |
| TPC command for scheduled PUCCH | 2 | Reserved |
| PUCCH resource indicator | 3 | Reserved |
| PDSCH-to-HARQ feedback timing indicator | 3 | Reserved |

Next, Message3 is described.

MSG3 is scheduled by an uplink grant in the RAR.

The MSG3 is transmitted after a minimum time interval from the end of MSG2.

Transmission power of MSG3 is configured in MSG2.

An SCS for MSG3 is configured in an RMSI including 1 bit (independently of an SCS for MSG1).

MSG3 includes a UE-Identity and an establishment cause.

First, with respect to the UE-Identity, an IMSI is transmitted in a message when it is first attached to a network.

If a UE is previously attached, an S-TMSI is included in the message.

Furthermore, the establishment cause may include emergency, MO-signaling, MO-data, MT-access, high-priority access, etc.

Table 9 below illustrates an example of a DCI format 0-0 having a TC-RNTI for MSG3 retransmission.

TABLE 9

| Field | Bits | Comment |
|---|---|---|
| Identifier for DCI formats | 1 | Indicate UL |
| Frequency domain resource assignment | | |
| Time domain resource assignment | X | Defined in Subclause 5.1.2.1 of TS 38.214 |
| VRB-to-PRB mapping | 1 | |
| Modulation and coding scheme | 5 | Use MCS table without 256QAM (UE capabilities not yet known) |
| New data indicator | 1 | Reserved |
| Redundancy version | 2 | Defined in Table 7.3.1.1.1-2 |
| HARQ process number | 4 | Reserved HARQ process 0 is always used |
| TPC command for scheduled PUCCH | [2] | Defined in Subclause 7.2.1 of TS 38.213 |
| UL/SUL indicator | 1 | |

An MSG4 configuration is described.

An MSG4 configuration is limited within a UE minimum DL BW.

An SCS for MSG4 is the same as a numerology for an RMSI and MSG2.

A minimum gap between the starts of MSG4 and HARQ-ACK is N1+L2.

In this case, N1 indicates a UE processing time, and L2 indicates a MAC layer processing time.

Retransmission order of MSG 3 and a distinction between MSG4s are described.

MSG3 retransmission: DCI format 0-0 having a TC-RNTI

MSG4: DCI format 1-0 having a TC-RNTI

FIG. 13 illustrates an example of the retransmission of MSG3 and MSG4 transmission.

Table 10 below is a table illustrating an example of DCI format 1-0 having a TC-RNTI for MSG4.

TABLE 10

| Field | Bits | Comment |
|---|---|---|
| Identifier for DCI formats | 1 | Indicate UL |
| Frequency domain resource assignment | | |
| Time domain resource assignment | X | Defined in Subclause 5.1.2.1 of TS 38.214 |
| VRB-to-PRB mapping | 1 | |
| Modulation and coding scheme | 5 | Use UE-capability-independent MCS table |
| New data indicator | 1 | Reserved |
| Redundancy version | 2 | Defined in Table 7.3.1.1.1-2 |
| HARQ process number | 4 | Reserved HARQ process 0 is always used |
| TPC command for scheduled PUCCH | [2] | Defined in Subclause 7.2.1 of TS 38.213 |
| UL/SUL indicator | 1 | |

Hereinafter, a random access procedure of an NR system is more specifically described.

A UE may transmit a PRACH preamble in UL as Msg1 of a random access procedure.

Random access preamble sequences having two different lengths are supported. A long sequence length 839 is applied as subcarrier spacing of 1.25 and 5 kHz, and a short sequence length 139 is applied as subcarrier spacing of 15, 30, 60 and 120 kHz. The long sequence supports a not-limited types set and limited types of sets A and B, but the short sequence supports only a not-limited type set.

Multiple RACH preamble formats are defined as one or more RACH OFDM symbols and different cyclic prefixes and a guard time. A PRACH preamble configuration is provided to a UE within system information.

If a response to Msg1 is not present, a UE may retransmit a PRACH preamble with power ramping within a given number. The UE calculates PRACH transmission power for the retransmission of a preamble based on the most recent estimation path loss and a power ramping counter. If the UE performs beam switching, the power ramping counter is not changed.

System information notifies the UE of association between SS blocks and RACH resources.

The contents (3GPP system, frame structure, NR system, etc.) described above may be combined and applied to methods proposed in the present disclosure to be described below, or may be supplemented to clarify the technical features of methods proposed in the present disclosure. The methods described below are distinguished for convenience of description, and it is a matter of course that partial configuration of any one method can be replaced with partial configuration of other method, or the methods can be combined and applied to each other.

In future wireless communication systems, diversified UE types should be considered and supported. Current LTE system is optimized for a single panel UE. A multi-panel UE is supported in Rel-15 NR system with a very limited scope. In Rel-15 NR, if multiple SRS resources are configured to a UE, the UE may transmit a set of SRS antenna ports configured in a SRS resource from one panel and another set of SRS ports configured in another SRS resource from another panel, and so on. For non-codebook based UL transmission, a set of SRS resources may be transmitted from the same panel by applying different beams, and another set of SRS resources may be transmitted from different panels by applying different beams. That is, beamforming on a per port basis is applied.

In summary, the UE can use a different transmission (Tx) panel for the transmission of a different (set of) SRS resources. After a base station receives and compares SRS ports, the base station may select one of the configured SRS resources and signal an SRS resource indicator together with a transmission precoding matrix indicator (TPMI) and a transmission rank indicator (TM) for codebook based PUSCH. If corresponding parameters are correctly received at the UE, the UE needs to use a panel indicated via SRI when performing the PUSCH transmission. For non-codebook based UL transmission, the base station signals only SRI, and the UE needs to apply selection layer(s) from a panel.

For codebook based UL, the current NR has following limitations for supporting the multi-panel UE.
  No support for different number of Tx antenna ports per panel
  No support or limitedly support for simultaneous use of multiple panels for the PUSCH transmission For non-codebook based UL, the following limitations apply.
  There is an ambiguity on a method of mapping each SRS resource to each panel
  No support or limitedly support for simultaneous use of multiple panels for the PUSCH transmission Another considerable point for the multi-panel UE is a distance between the panels. The distance between the panels may not be so far for handheld devices, but the distance between the panels may be far from each other for a large device, e.g. a vehicle. For a vehicle UE, a vehicle may be a device receiving signals for downlink and transmitting signals for uplink. For sidelink, the vehicle may be a transmitter and/or a receiver. Most of current vehicles have geographically co-located antennas (e.g., single panel). However, geographically distributed antennas (e.g., multi-panel) have been considered for development in order to achieve more gain from multiple antennas (e.g., beamforming, spatial diversity) and meet the NR requirements (in some NR bands, the use of four Rx antennas is mandatory). For the geographically distributed antennas at the UE side, the distance between the panels may be as large as more than a few meters (e.g., one panel of a front bumper and another panel of a rear bumper), and a direction of each panel may also be different from each other. Thus, the fading characteristic of each panel can be totally different from each other.

Moreover, each panel may have different hardware characteristic. For the geographically distributed antennas, a distance from each panel to a baseband processor may be different especially if they share a common baseband processor (modem). Thus, a gain imbalance across different panels may occur for both transmission and reception. In addition, a difference on the length of the cable may cause a different delay (i.e., timing synchronization) across different panels. A timing difference across different panels may be or may not be calibrated internally depending on UE implementation since the addition of a timing calibration processor/circuit may increase the UE implementation cost.

Besides the cabling, employing different hardware components per panel (e.g., oscillator, different RF/circuit structure, amplifier, phase shifter, etc.) may cause (or enlarge) a difference in the experienced channel characteristics on different panel such as phase noise, frequency offset, and timing offset.

In the present disclosure, 'panel' may refer to a group of physical Tx/Rx antennas that are closely located with respect to hardware implementation. The 'panel' may refer to a group of antenna ports (e.g., logical antennas) that have some commonality in terms of their effective channel due to their shared hardware components (e.g., amplifier, hardware board, etc.) as well as their geographic locations that are not far from each other. More specifically, the antenna ports transmitted from the same panel can be observed at a receiver that their long-term channel properties such as average pathloss, average doppler shift, average delay are similar or the same. From a reception perspective, for a transmitted antenna port, the observed signals from different logical antennas within the same panel may be assumed to have a commonality in terms of long-term channel properties. In addition to the long-term channel properties described above, a panel may share the same Tx/Rx (analog) beam, but different panels may use different (analog) beams. In other words, each panel is more likely to control their own beam separately due to their geographical difference.

In the present disclosure, '/' may mean 'or' or 'and/or' depending on the context.

The present disclosure specially focuses on the UL synchronization issue for multi-panel UEs among the above-described issues. For the multi-panel UEs, the optimum best timing advance (TA) value may be different for each panel according to the above-described UE implementations (e.g., distributed antennas at the UE).

In the previous systems, a single TA value is assumed that the geographical locations of multiple antennas per UE are sufficiently close each other. Thus, the single TA value is provided by the base station per component carrier (CC) per device. It is also assumed that UL Tx timing across different Tx antennas is well-calibrated inside the UE as a UE implementation.

The two above-described conventional assumptions (geographical co-location and internal calibration) may not hold anymore for new device types (e.g., vehicle UEs). Thus, there is a need to introduce a new signaling method to allow different TA values for different panels.

The unit for sharing/non-sharing a common TA value may not be coupled with real hardware implementation. Some panels may share the same TA value if the panels are well-calibrated internally and/or geographically closely located. On the other hand, each panel may have multiple UL (analog) beams or UL antenna subbsets, and there is a possibility on having quite a different channel properties per different beam or antenna subbset even if they belong to the same panel according to the way of UE implementation. For example, if different beams are generated using a different set of antennas within a panel and if the hardware properties of each set of antennas are noticeably different from each other, the above assumption (i.e., one TA value per panel per CC) may be incorrect.

Thus, there is a need to define a generic term (i.e., UL synchronization unit (USU)) that indicates a group of UL antenna ports and/or physical UL channels that are synchronized with respect to UL timing. The USU may correspond to one or multiple UL panels, one or multiple UL beams, or a group of UL antennas within a UL panel according to different UE implementations.

In the present disclosure, the USU may represents a group of UL antenna ports and/or a group of UL resources having a common property (e.g., common TA value, common power control parameter, etc.). For example, the USU may be referred/replaced as at least one uplink transmission entity (UTE), at least one group of UTEs, at least one panel, at least one group of panels, at least one beam, at least one group of beams, at least one antenna (or antenna port), at least one group of antennas (or antenna ports), etc. Furthermore, in the present disclosure, antenna (or antenna port) may represent physical or logical antenna (or antenna port).

Hereinafter, methods related to uplink synchronization unit (USU) are described.

[Proposal 1]

A generic term, an uplink synchronization unit (USU) that associates/groups uplink antenna ports (UL APs) and/or physical UL channels may be defined to apply a common timing advance (TA) value within a component carrier (CC).

For reference, the USU may contain UL APs with different RS/channel types and the same RS/channel type. For example, the USU may contain a set of SRS APs (or SRS resources), a set of PUCCH DMRS APs (or PUCCH resources), a set of PUSCH DMRS APs (or PUSCH resources), and/or a set of PRACH preambles/resources.

The grouped APs/channels share a common TA value per CC, and non-grouped APs/channels may have different TA values per CC.

The USU may be based on i) one or multiple UL panels, ii) one or multiple UL beams, or iii) a group of UL antennas within a UL panel.

Most of information related to the USU may not change frequently. That is, information related to the USU may be provided via RRC signaling. However, a specific type of antenna ports/channels related to the USU may need to change more frequently than others depending on panel activation/deactivation, wireless channel condition, and so on. For example, the association of PUCCH/PUSCH (APs) may need to be changed more frequently than the association of SRS/PRACH. Therefore, lower layer signaling (e.g., MAC CE and/or DCI) may be used to change USU mapping more quickly and frequently for those antenna ports/channels.

Hereinafter, an operation of a base station/UE is described in more detail based on the proposal 1.

[1-1]

After successfully receiving TA values for USUs, UE applies the TA value for the transmission of UL signal included/associated to the corresponding USU. If two SRS resources are configured to a UE (if SRI #0 is configured on USU #0 and SRI #1 is configured on USU #1), the UE may transmit SRS as follows.

The UE may transmit SRS on the SRS resource #0 based on TA #0 on a specific panel (e.g., panel #0), and may transmit SRS on the SRS resource #1 based on TA #1 on another panel (e.g., panel #1).

If a PUCCH resource is configured on USU #0, the UE should use panel #0 for the transmission of the PUCCH (with applying TA value (TA #0) corresponding to the transmission of the PUCCH).

[1-2]

The actual mapping between the USU and the panel (or beam) may be up to the UE, but the UE should use the same physical resource (e.g., panel) for the transmission of UL signals included in the same USU. For the transmission of PUSCH (or multi-layer PUCCH), a PUSCH may be associated to multiple USUs, but each USU may include a part of PUSCH layers or may be associated with a part of PUSCH layers. For example, some of PUSCH DMRS ports may be included in/associated to USU #0, and other PUSCH DMRS ports may be included in/associated to USU #1.

For a PUSCH transmission, the associated USU(s) information may be indicated dynamically through DCI rather than configuring it via higher layer signaling. The associated USU information may be signaled via a dedicated DCI field or via a dedicated RNTI per USU. If multiple USUs are indicated for a PUSCH transmission, the association between PUSCH layers and USU IDs may also be indicated dynamically through DCI instead of pre-configuring it via higher layer signaling.

In this case, higher layer signaling (e.g., RRC and/or MAC-CE) may provide information on which set of USUs are used for PUSCH transmission. Then, lower layer signaling (e.g., DCI) may indicate which layer(s) are associated to which USU.

Instead of signaling the association of layers into USUs, a rule for association may be defined (e.g., for rank 3, first two layers are mapped to the first USU and the last layer is mapped to the second USU). In this regard, it is also possible to allow the following physical uplink channel (e.g., PUSCH or PUCCH) or signal.

Physical uplink channel/signal that is not associated to any of USUs

Physical uplink channel/signal that is associated to multiple USUs for the same layer(s)

In these cases, the same UL signal can be transmitted (duplicatedly) on multiple physical resources (e.g., panels) with possibly different TA values applied to each physical resource.

[1-3]

From base station/network perspective, the base station/network needs to know the number of TA values that needs to be controlled separately. If the base station/network knows the number, the base station/network can configure PRACH resource(s) to the UE in accordance with the number.

In addition, it is also a valuable information about whether or not different TA values can be applied simultaneously at a UE. In other words, this information corresponds to whether or not different APs corresponding to different USUs can be multiplexed in frequency (frequency domain multiplexing (FDM)).

If USU corresponds to a panel, the following matters in relation to a management of the TA value may be considered.

In relation to a type of the UE, there can be a UE that is able to transmit UL signals only on one panel at a time. In this case, multi-panel is implemented based on a panel-level switch. For this type of UEs, multiple TA values needs to be managed, but only one TA value can be applied at a time.

For another type of UEs, UL signals can be simultaneously transmitted on different panels by applying different TA values per panel. From the base station/network perspective, information on the number of TA values that should be separately controlled is necessary to configure/trigger different UL signals/channels. Hereinafter, matters related to the number of USUs are described in detail in proposal 2.

[Proposal 2]

A method for a UE to report the required total (additional) number of USUs (or TA values) N (per CC) to a base station/network may be considered.

In addition, the UE may report the maximum number of USUs (or TA values) M (per CC) that can be applied (or transmitted) simultaneously.

Here, 'simultaneous transmission' may refer to the transmission on the same symbol (set) or on the same slot.

If M is reported, the UE is not expected to be configured/indicated to transmit UL signals/channels belonging to more than M USUs in a given time unit (e.g., symbol, a set of symbols, slot).

The 'UL signal/channel' above may include symbols other than the symbols for actually indicated UL signal/channel (e.g., one additional symbol in the front/back of the indicated UL signal/channel).

This is because applying different TA values on different UL signals would misalign the symbol boundary so that they can collide on a symbol located in the front or in the back even if the configured symbol indices are not overlapped.

The time required for panel/beam/antenna switching may also affect the additionally added number of symbols (or slots). Particularly, for panel switching, it requires a relatively long time until hardware of a panel is sufficiently stabilized after the panel activation. Accordingly, the required time (or symbols or slots) for switching USU(s) may be reported by the UE. In addition, the number of added symbols may be configured by the base station/network. The number of added symbols may vary depending on whether it is for beam switching within the panel or for panel switching.

The information (M) about the number of USUs that can be simultaneously applied/transmitted may be generalized (or replaced) as USU grouping information that which of N USUs can or cannot be transmitted simultaneously.

The USU grouping information is described in detail based on the following assumptions:
1) assumption that three USUs are needed, and two of them are for two different beams (or antenna groups) for a panel and the remaining USU is for another panel.
2) assumption that only one of the two USUs within a panel can be applied at a time due to the switching-based implementation within the panel and assumption that those two panels can be used simultaneously.

In the case of the 1) and 2) above, the maximum number M of USUs that can be simultaneously applied/transmitted is not sufficient information. Rather, information for combinations of USUs that can be applied/transmitted simultaneously is more beneficial.

Considering the above example, USUs may be grouped as follows. Specifically, USUs that cannot be transmitted simultaneously (i.e., USUs within a panel) may be grouped together. In this instance, different USU groups may be assumed to be able to transmit simultaneously.

The USUs may be grouped in another way. That is, simultaneously transmittable USUs may be included in a USU group, and simultaneously non-transmittable USUs may be included in different USU groups.

[2-1]

When the proposed information N is reported by the UE, the network may configure up to N USUs to the UE. In each USU, one or more PRACH preamble(s)/resource(s) may be associated in addition to SRS, PUCCH, and/or PUSCH. In other words, when PRACH preambles/resources are configured UE-specifically, each PRACH preamble/resource may be associated to a specific USU (USU ID). Based on above association, when a UE receives TA command in response to a PRACH preamble/resource, the UE can assume that the TA value corresponds to the USU associated with the PRACH preamble/resource so that the corresponding TA value can be used for all other UL signals/channels (e.g., SRS, PUCCH, PUSCH) associated to the same USU.

[2-2]

On the other hand, it is also possible to share a PRACH preamble/resource for acquiring TA values for multiple USUs if it is triggered one by one. More specifically, a PRACH can have no association to any of USUs or can be shared for multiple USUs. In these cases, there can be an ambiguity on which USU to be applied when a UE receives a TA command. To address this issue, the exact USU information (e.g., USU ID) needs to be signaled to a UE when a TA command is delivered. In this regard, the detailed signaling may be based on one of the following options.

Option 1: the associated USU information is provided together with PRACH transmission command.

Option 2: the associated USU information is provided through MSG2.

Option 3: the associated USU information is provided through MSG4.

Option 4: the associated USU information is provided immediately after an RACH procedure.

Option 5: TA value per USU is updated/configured using a separate signaling (procedure).

For above options, one method to signal the USU information is to define a DCI field that indicates the USD ID. Another method may be to use different RNTIs per USU, where this mapping information (RNTI per USU) may be configured by higher layer signaling or pre-defined. The other method for the signaling of the associated USU information is to use a higher layer message (e.g., MAC-CE or RRC).

For the option 5, it is beneficial to use higher layer signaling (e.g. MAC-CE, RRC) considering the size of information. In this case, a signaling (procedure) to update a part of information (e.g., TA value for a specific USU) may also be needed, and this signaling for the update may be performed via a lower layer signaling than the signaling for configuring the whole information in order to reduce latency.

As described above, two different approaches are proposed from the usage of PRACH perspective. Effects according to the two approaches are compared as follows.

1) The use of multiple PRACH preambles/resources (e.g., one PRACH per USU) may require more signaling overhead, but can reduce latency for acquiring multiple TA values for multiple USUs. 2) If a PRACH is shared for all USUs, PRACH resources are saved, but the latency for acquiring the TA value for each USU increases.

A hybrid approach of the two approaches may also be considered, and in this case, a PRACH is shared for a subset of USUs. Since each approach has the pros and cons for resource overhead vs. latency, the number of PRACH resources shared for the subset of USUs to be configured for a UE may be up to base station/network's choice, but the maximum possible number is limited to N (per CC).

In above proposals, the above-mentioned PRACH resource associated to USUs may be based on at least one of contention-free PRACH resource and contention-based PRACH resource.

[Proposal 3]

A PRACH preamble/resource may be associated with one or more USUs.

The TA value provided by a base station in response to a PRACH preamble/resource corresponds to the USUs (or one of multiple USUs) associated to the PRACH preamble/resource.

(If multiple USUs are associated to a PRACH), the USU information may be additionally indicated to the UE using one or more signaling options of the options 1 to 5 proposed above.

(If multiple USUs are associated to a PRACH), the USU corresponding to the indicated TA value may be determined implicitly by a rule (e.g., the n-th indicated TA value corresponds to the n-th USU among the associated USUs).

The above proposed methods may not be applicable for some cases, especially when PRACH transmission is handled by the UE, not the base station (e.g., initial RACH, contention based PRACH, PRACH transmission for beam failure recovery). In this case, there occurs an ambiguity on the UE operation in relation to the USU/PRACH/panel/beam to be used.

For these cases, the following method may be considered. Specifically, a method for the network/base station to provide association information between each USU (or TA value) and DL RS (e.g., CSI-RS resource, SSB) to a UE may be considered. Based on this information, the UE can find out which USU/panel/beam/antennas/TA to use when quality of the DL RS is good (or is equal to or greater than a threshold). Based on the above information, the network may indicate the associated DL RS instead of the USU ID in order to indicate which panel/beam to use and/or to indicate which TA value to apply. Accordingly, signaling according to the option 1 proposed above may be extended to indicate associated DL RS instead of USU information. The DL RS indication is described in detail in the following proposal 4.

[Proposal 4]

A base station/network may provide association between USUs (or TA values) and DL RSs (e.g. CSI-RS resources, SSBs) to a UE.

For (UE initiated) UL transmission, the UE may select a DL RS based on its quality and apply the USU (panel/beam/antennas and/or TA value) associated to the selected DL RS.

In the above approach, a USU may be associated to multiple DL RSs, and a DL RS may also be associated to multiple USUs. For the latter case, the UE may use multiple panels/beams/antennas (USUs) for the transmission of antenna ports/channels if the DL RS associated to multiple USUs is selected. The UE can also choose more than one DL RSs for better robustness.

Besides the above approach, it may also be possible to (mandate the UE to) use all USUs (panels/beams) (that can be transmitted simultaneously) in the case of UE initiated UL transmission but with sacrificing UE power consumption. This is to improve coverage and reliability.

Multiple approaches (selected USU, all USUs) can be supported as a complementary method for each other. In this case, the network/base station may configure an approach to use for a specific UL transmission.

If a UE is able to transmit multiple USUs at the same time, the UE can transmit multiple PRACH preambles/resources. Here, each PRACH is transmitted on different set of panels/beams/antennas. In this case, the UE needs to receive one of multiple TA values for each USU as a response to the PRACHs. A signaling method related to the multiple TA values is described in the following proposal 5.

[Proposal 5]

After a UE (simultaneously) transmits multiple PRACH preambles/resources, UE/base station operation according to the following method 1 or method 2 may be performed.

Method 1)

A base station may provide multiple TA values at the same time via MSG2 or MSG4. In this case, mapping between each TA value and each PRACH (or USU(s)) may be signaled explicitly or implicitly.

An example of implicit signaling is as follows.

1) If an indicated TA value is TA #1, TA #2, . . . , TA #K,

2) TA #k corresponds to the k-th PRACH preamble/resource ID (where k=1, K).

Method 2)

A base station first provides one TA value via MSG2, and then provides other TA values via MSG4 or other message transmitted after MSG4.

The TA value provided by MSG2 may represent one or more of the following 1) to 3).

1) The TA value that needs to be applied for transmission of MSG3

2) The TA value that corresponds to a specific USU

3) A reference value for the succeeding TA information signaling

In the case of the 2) above, the USU information may additionally be indicated by the base station. Alternatively, the USU information may be determined by a specific rule (e.g., the first USU ID, the USU corresponding to the transmitted PRACH preamble/resource with the lowest ID). For the USU information related signaling, DCI field based and/or RNTI based method proposed under the options 1 to 5 may be applied.

For reducing overhead, the TA value(s) in MSG4/TA value in a message after MSG4 may represent differential value(s) with respect to the TA value signaled in MSG2.

Among multiple USUs, one initial/default/reference USU may be defined or assumed.

The initial/default/reference USU may be based on at least one of the following USUs.

a USU that the UE chooses to use (initial or previous) PRACH transmission a USU that corresponds to an initially (or firstly or previously) acquired TA value a USU that has used for communication between the UE/base station so far.

The UE may use one initial/default/reference USU (e.g., panel) until the network indicates/allows to use multiple USUs or to switch to other USU(s). In this sense, the value of N in the proposal 2 may refer to the additional number of USUs besides the initial/default/reference USU. A detailed example related to the application of the value of N is described below.

For example, if a UE has two panels (i.e., two USUs), the UE may operate for contention based PRACH transmission and subsequent UL transmissions as follows. The UE may initially select and use one panel and apply the corresponding TA for the selected panel (i.e., default TA value for the default USU) for initial communication with the base station that has responded to the UE. After that, the UE may inform the base station that the UE has one more USU where a different TA value may need to be applied (according to the base station's request or UE autonomously). In this example, N=1. With the modified definition of N, the following procedure may be performed.

Step 1) The UE autonomously selects a USU (e.g., panel) for transmission of MSG1 (e.g., contention based PRACH)

Step 2) A TA value is provided by MSG2. That is, a default TA value for the selected USU is provided.

Step 3) The UE informs the value of N or existence of additional USU through MSG3.

Step 4) The base station may (configure and) trigger (sequential/simultaneous) transmission of N (contention free) PRACH(s) via MSG4 or other messages Step 5) The UE transmits N PRACH(s) for other USUs to the base station.

Step 6) The UE receives TA values for other USUs in response to the N PRACH(s).

In this case, a contention based PRACH may be transmitted on the default USU, and contention-free PRACH(s) may be assigned/used for other USU(s). For improved signaling efficiency, the TA value(s) for USU(s) other than the default/reference USU may be informed to the UE as a differential value with respect to the default/reference TA value for the default/reference USU.

The reference TA value may be delivered to a UE in response to the contention based PRACH, and the differential TA value may be delivered to a UE in response to the non-contention based PRACH. Since the difference in the TA values between different USUs could be mainly caused by the relative distance of the panels (e.g., cabling delay) rather than the absolute locations of the panels. In this regard, the differential TA value, which is referred to as delta-TA, needs to be changed less frequently than the difference of the actual TA value which can be changed relatively fast according to UE's movement speed. Therefore, for improved signaling efficiency on the TA indication, a higher layer message (e.g., MAC-CE, RRC) may be more profitable for the signaling of delta-TA compared to that for signaling of the default/reference TA.

[Proposal 6]

After acquiring a TA value for (initial/default/basic) communication with a base station, a UE may request/report the existence of additional USU(s) and/or the number of (additional) USUs.

In response to the above request/report, the base station may immediately trigger a PRACH for the additional USU.

Reporting/requesting information above may be replaced by 'request/report on the need of additional UL synchronization (process(es) and/or the number of required TA values (or processes)'.

The additional TA value(s) is informed as a differential value(s) with respect to the initially (previously) acquired TA value (i.e., delta-TA). The delta-TA value may be signaled via a higher layer message.

The UL signals transmitted from each UE panel may be targeted to the same transmit and reception point (TRP) as well as different TRPs. For the case of targeting a common TRP (or TRP's beam or TRP's panel) across multiple USUs, the different TA value per USU may be for synchronous UL reception of the target TRP. Therefore, it would be more efficient when it is defined a TA adjustment command (i.e., an increase or decrease of previous TA) that is commonly applied to multiple TA values for the multiple USUs. For example, if the base station commands to reduce TA by J samples to a UE, the UE reduces the TA values for all (or some) of USUs by J samples even if their absolute TA values have been signaled independently.

It is also possible that different USUs may be targeted to be received by different TRPs or different Rx beams/panels of a TRP. For example, the TA values are set for i) the synchronous reception of the signals on USU #0 and USU #1 by TRP #A, and ii) the synchronous reception of the signals on USU #2 by TRP #B. In this case, the set of USUs sharing the TA adjustment command needs to be configured/indicated by the base station/network (i.e., USU #0 and USU #1 in the above example). In addition, if the USU grouping information is previously configured to a UE, the USU set/group ID can be informed together with the TA adjustment command. Alternatively, if the USU grouping information is not configured to a UE, the set of USU IDs to which the command is commonly applied can be directly informed to the UE together with the TA adjustment command (e.g., via a bitmap of USU IDs).

[Proposal 7]

A TA adjustment command that indicates an increase or a decrease of previously indicated TA value(s) (by a certain amount) from a base station may be commonly applied to multiple TA values for multiple USUs.

The set of USUs sharing the adjustment command may be additionally informed/indicated by the base station.

For an (initial) RACH procedure based on contention based PRACH, it may also be possible that a UE having multiple USUs transmits multiple PRACHs. Here, each PRACH is transmitted on a specific set of physical resources (e.g., panels), and the set is autonomously selected by the UE.

For example, a UE can transmit PRACH #0 on panel #0 and PRACH #1 on panel #1, but the network does not have any information on which panel (or USU) the UE uses for the transmission of each PRACH. If the UE successfully receives only one response (i.e., MSG2) for the PRACHs, the UE can (temporarily) use the corresponding panel for the subsequent UL transmissions. If the UE successfully receives multiple responses, the UE can have two different TC-RNTIs since the base station cannot distinguish whether the multiple PRACHs are transmitted by two different UEs or by the same UE. After a successful contention resolution based on MSG3 and MSG4, the UE may have two different C-RNTIs. Having multiple C-RNTIs (Cell-RNTIs) for a UE would unnecessarily increase the number of PDCCH blind detections and can unnecessarily spend the RNTI resource from a base station perspective. Therefore, there is a need to merge them or discard the remaining RNTIs expect for one RNTI.

The following proposal 8 describes the multiple TC-RNTIs (multiple C-RNTIs) in detail.

[Proposal 8]

A UE may perform at least one of the following operations in relation to assignment of multiple TC-RNTIs or multiple C-RNTIs.

1) The UE may inform a network/base station whether the UE is assigned multiple TC-RNTIs or multiple C-RNTIs.

2) The UE may request the network/base station to merge the multiple TC-RNTIs or the multiple C-RNTIs or discard some of them (e.g. discard the remaining RNTIs except for only one RNTI).

In this case, information about duplicated TC-RNTIs/C-RNTIs may be sent via at least one of MSG3, a response to MSG4, or other messages.

An example of a procedure related to the proposal 8 is described below.

Step 1) The UE transmits contention based PRACH #0 with panel #0 and contention based PRACH #1 with panel #1. The transmission of each PRACH may be performed through the use of a PRACH Tx instance according to the following i) or ii).

i) Different PRACH Tx instance using the same PRACH preamble/resource ii) Same/different PRACH Tx instance using different PRACH preamble/resource In the case of the ii) above, different RA-RNTI is mapped per USU.

Step 2) The base station delivers two MSG2s to each of PRACH #0 and PRACH #1, using different RA-RNTIs. Here, each MSG2 contains a TA value, a PUSCH resource allocation (for MSG3) and a TC-RNTI.

Step 3) The UE transmits one or two MSG3s on one or two PUSCHs, where each PUSCH is scheduled by each MSG2. In MSG3, the UE informs the base station of an event of duplicated TC-RNTIs.

Example 1: If two PUSCHs are used/transmitted for MSG3, at least one of the two MSG3s may include information about the duplicated TC-RNTIs, information about unnecessary TC-RNTI, or information about TC-RNTI to be used in addition to UE-ID, etc.

Example 2: If only one PUSCH is used/transmitted for MSG3, information about the unused PUSCH may be included in MGS3 in addition to UE-ID, etc.

Example 3: If two PUSCHs are used/transmitted for MSG3, one of the two MSG3s may include information indicating that this MSG does not need to respond.

Step 4) The base station provides the same C-RNTI via two MSG4s or one C-RNTI via one MSG4. For the latter case, the UE may not search MSG4 according to the following i) and ii).

i) MSG4 for MSG3 indicating that the UE does not need to respond ii) MSG4 for TC-RNTI indicated to be discarded through MSG3

Another example of the procedure related to the proposal 8 is described below.

Step 1) and Step2) are the same as above

Step 3) The UE transmits two MSG3 on two PUSCHs, where each PUSCH is scheduled by each MSG2. In the two MSG3s, existing MSG3 information is included (e.g. UE-ID).

Step 4) The base station provides two C-RNTIs via two MSG4s, respectively

Step 5) The UE reports the occurrence of an event related to multiple C-RNTIs. In addition, the duplicated C-RNTIs, unnecessary C-RNTIs, C-RNTI to be discarded, or a selected C-RNTI to be used may be notified through the following i) or ii).

i) Response to MSG4 ii) Separated signaling procedure from RACH (e.g., procedure performed during an RRC establishment procedure)

As above, the PRACH procedure of the two cases may be considered. For simplicity of the procedure, the corresponding procedures may be generalized into multiple PRACH transmission.

If a UE is able to use only a single panel at a time (due to its limited power/energy or hardware structure), simultaneous transmission of multiple PRACH resources using multiple panels may not be feasible to the UE. For these UEs, the network may also associate some of dedicated PRACH resources for each USU as described in the proposal 3. In this approach, the required number of PRACH resources increases as the number of USUs increases. Method(s) to share a PRACH resource for multiple USUs are described in detail below.

Information related to the association between PRACH and USU may not be provided by the base station. Or, the information may be provided by the base station where one PRACH resource is associated to multiple USUs.

There are multiple cases for a UE to transmit PRACH after completing the initial access procedure. For example, there are cases in which: i) the base station orders to transmit PRACH (PDCCH orders PRACH), and ii) a beam failure event happens on the current CC (component carrier, or cell) ([3GPP TS 38.213] [3GPP TS 38.321]).

There is a proposal to use PRACH, PUCCH or PUSCH when a beam failure event happens on other CC(s), especially for recovering a beam failure on a SCell (where the SCell may not have an UL carrier). For these cases (especially, the BFR case), a method for a UE to select a USU for the MSG1 transmission (e.g., PRACH/PUCCH preamble transmission) based on the UE's own decision may be considered. This embodiment may be limited and applied to when the PRACH/PUCCH/PUSCH is not associated to a specific USU. If MSG1 is successfully delivered to the base station, the base station may require the USU information used for the MSG1 transmission to control the USU(s) for subsequent UL transmissions (e.g., PUSCH, PUCCH, SRS). In this regard, this is described in detail the following proposal 9.

[Proposal 9]

For a PRACH (or PUCCH or PUSCH) resource shared by multiple USUs, a UE selects a USU for the transmission of PRACH (or PUCCH or PUSCH) by its own decision and delivers the selected USU ID to a base station/network. The signaling may be performed on the PRACH (or PUCCH or PUSCH) resource or performed after or together with the PRACH (or PUCCH or PUSCH) transmission.

The PRACH (or PUCCH or PUSCH) resource may be a (dedicated or reserved) resource for transmitting a beam failure recovery request (BFRQ) or a scheduling request (SR) to the base station. The UE may transmit the PRACH (or PUCCH or PUSCH) when a beam failure event has occurred (on the serving cell or on other Scell) or when there is UL data (or UL-SCH) to be transmitted to the base station.

The PRACH may be a PRACH based on a PDCCH order. The PRACH is a PRACH triggered based on PDCCH by the base station. When the PDCCH is used for triggering PRACH, DCI includes a random access preamble index, a PRACH MASK index, a SS/PBCH index, etc.

The above proposal may be or may not be applicable for PRACH/PUCCH for usages other than BFRQ, SR and/or PDCCH order PRACH.

Exemplary procedures related to the above proposal are described with reference to FIGS. 14 and 15.

FIG. 14 is a flow chart illustrating an example of a signaling procedure according to an embodiment of the present disclosure.

S1410) (When a PRACH/PUCCH resource is shared by multiple USUs or a PRACH/PUCCH resource is not associated to any USUs,) the UE autonomously selects a USU (e.g., panel) for transmission of MSG1 (e.g., a contention free PRACH or a PUCCH dedicated for a beam failure recovery request).

Other reporting information may be explicitly delivered via reporting content/parameter on the resource or implicitly delivered via using other PRACH/PUCCH resource.

Examples of other reporting information in case of BFR: whether or not the UE has found a new beam that is equal to or greater than a threshold, failed CC index(es), and new beam ID (e.g., CRI or SSBRI) with quality (e.g., L1-RSRP) that is equal to or greater than a predefined/preconfigured threshold S1420) A response from a base station is provided by MSG2 (if the base station correctly detects and receives MSG1).

MSG2 may be delivered to the UE as DCI via CORESET BFR or normal CORESET or as a MAC-CE message on a PDSCH.

Alternatively, if Msg2 is delivered based on an existing DCI format on an existing CORESET, MSG2 may be existing MSG2 (e.g., MSG2 of FIG. 10/FIG. 11) or an existing DCI (e.g., PUSCH allocation related DCI using DCI format 0_0 or 0_1).

S1430) The UE reports the USU information used for transmission of MSG1 through MSG3 (or together with MSG3).

MSG3 may be delivered to the base station as a UCI on a PUSCH/PUCCH or as a MAC-CE message on a PUSCH.

The resource allocation for PUSCH/PUCCH may be granted by the base station after MSG2 (or together with MSG2). Alternatively, MSG3 may be delivered on a PUCCH/PUSCH configured/triggered/activated for other usage (e.g., grant-free PUCCH/PUSCH, PUSCH/PUCCH for semi-persistent CSI reporting, PUCCH for periodic CSI reporting, PUCCH for ACK/NACK, PUCCH for scheduling request).

In order to transmit the UL channel used for MSG3, the UE may use the same USU as used for transmitting MSG1.

The USU information includes at least USU ID. The USU ID may be replaced by a SRS resource group ID, a PUCCH resource group ID, or other IDs.

In MSG3, other reporting information may be delivered to the base station together, depending on the use case of this procedure and the information included in MSG1.

Examples of other reporting information in case of BFR: whether or not the UE has found a new beam equal to or greater than a threshold, failed CC index(es), new beam ID (e.g., CRI or SSBRI) with the quality (e.g., L1-RSRP) that is equal to or greater than a predefined/preconfigured threshold, and the quality of the new beam (e.g., L1-RSRP, L1-SINR).

S1440) The base station reconfigures/triggers/changes/updates USU information for subsequent UL transmission based on the USU information provided in MSG3 via MSG4 or other messages.

If the base station does not change the USU and depends on other existing procedures (e.g., radio link failure, SCell deactivation), Msg4 may be as follows. The Msg4 may be existing MSG4 (e.g., MSG4 of FIG. XX) or a message/signaling defined for USU (or panel) ID indication for PUCCH/PUSCH/SRS transmission.

The UE may use the USU used for MSG1 and/or MSG3 for other PUCCH, PUSCH and/or SRS transmission after transmitting MSG3 (e.g., UL Tx procedure in FIG. 14).

The UE behavior may last until the base station configures/triggers PUCCH and/or PUSCH and/or SRS transmission with a USU ID (which is different from the USU ID used for MSG1 and/or MSG3).

FIG. 15 is a flow chart illustrating another example of a signaling procedure according to an embodiment of the present disclosure.

Steps S1520 to S1540 in FIG. 15 may be performed based on the existing procedure. Content of FIG. 15 that is different from the description of FIG. 14 is underlined below.

S1510) (When a PRACH/PUCCH resource is shared by multiple USUs or a PRACH/PUCCH resource is not associated to any USU,) a UE autonomously selects a USU (e.g., panel) for transmission of MSG1 (e.g., a contention based PRACH, or a PUCCH dedicated for beam failure recovery request, or a PUSCH), and the UE reports USU information used for transmission of MSG1 with MSG1 (or including it in MSG1).

The USU information includes at least USU ID. The USU ID may be replaced by a SRS resource group ID, a PUCCH resource group ID, or other ID.

The USU ID may be delivered explicitly by a message or UCI in the case that MSG1 is delivered on PUCCH/PUSCH.

The USU ID may be delivered implicitly. For example, different USU IDs may be delivered implicitly based on different information. The different information includes at least one of sequences, RE mapping, format, PRB location/size, transmit (symbol/slot) occasion, or antenna port(s).

In case of implicit delivery, the base station may have to blindly search the PRACH/PUCCH resource based on the possible combinations of USUs to know the USU ID used for MSG1 transmission.

For this reporting, the UE may use a PUCCH/PUSCH that is previously configured/assigned/triggered for other UCI (e.g., ACK/NACK or CSI) or UL-SCH (e.g., grant-free PUSCH), or the UE may use a PUSCH that is assigned to the UE via a normal scheduling request procedure.

Other reporting information may also be delivered explicitly via reporting content(s)/parameter(s) on the resource or delivered implicitly using other PRACH/PUCCH resource(s).

Examples of other reporting information in case of BFR: whether or not the UE has found a new beam that is equal to or greater than a threshold, failed CC index(es), and new beam ID (e.g., CRI or SSBRI) with quality (e.g., L1-RSRP) that is equal to or greater than a predefined/preconfigured threshold.

S1520) A response from the base station is provided by MSG2 (if the base station correctly detects and receives MSG1).

MSG2 may be delivered to the UE as a DCI via CORESET_BFR or normal CORESET or as a MAC-CE message on a PDSCH.

Alternatively, if Msg2 is delivered based on an existing DCI format on an existing CORESET, MSG2 may be existing MSG2 (e.g., MSG2 of FIG. 10/FIG. 11) or an existing DCI (e.g., PUSCH allocation related DCI using DCI format 0_0 or 0_1).

S1530) Other (remaining) reporting information may be delivered to the base station as MSG3.

MSG3 may be delivered to the base station as a UCI on a PUSCH/PUCCH or as a MAC-CE message on a PUSCH.

The resource allocation for PUSCH/PUCCH may be granted by the base station after MSG2 (or together with MSG2). Alternatively, MSG3 may be delivered on a PUCCH/PUSCH configured/triggered/activated for other usage (e.g., grant-free PUCCH/PUSCH, PUSCH/PUCCH for semi-persistent CSI reporting, PUCCH for periodic CSI reporting, PUCCH for ACK/NACK, PUCCH for scheduling request).

For MSG 3 (and other subsequent PUCCH/PUSCH/SRS transmission after transmitting MSG1), the UE may use the USU used for MSG1 (e.g., MSG3/UL Tx procedure in FIG. 14).

The UE behavior may last until the base station configures/triggers PUCCH/PUSCH/SRS transmission with a USU ID. In this instance, the USU ID may be different from the USU ID used for MSG1 and/or MSG3.

Examples of other reporting information in case of BFR: whether or not the UE has found a new beam that is equal to or greater than a threshold, failed CC index(es), new beam ID (e.g., CRI or SSBRI) with quality (e.g., L1-RSRP) that is equal to or greater than a predefined/preconfigured threshold, and the quality of the new beam (e.g., L1-RSRP, L1-SINR).

If there is no additional (dedicated) reporting information, MSG3 may be existing MSG3 (e.g., MSG3 of FIG. 10/FIG. 11), or an existing beam/CSI related reporting, or a UCI/MAC-CE message defined for reporting new beam information (and failed CC index(es)) in case of BFR.

S1540) The base station reconfigures/triggers/changes/updates USU information for subsequent UL transmission based on the USU information provided in MSG3 via MSG4 or other messages.

If the base station does not change the USU and depends on other existing procedures (e.g., radio link failure, SCell deactivation), MSG4 may be as follows. The MSG4 may be existing MSG4 (e.g., MSG4 of FIG. XX) or a message/signaling defined for USU (or panel) ID indication for PUCCH/PUSCH/SRS transmission.

In the above proposals (and examples), the TA value may be provided to the UE by MSG2, MSG4, or another message. In this case, since the TA value is applied for the USU used for the MSG1 transmission, other UL transmissions related to the USU should use the corresponding TA value for transmission. If one TA value can be commonly applied to multiple USUs/panels (which may be dependent on a UE capability), e.g., when the panels are closely located and sufficiently well calibrated in terms of transmission timing, the TA value may be applied for the multiple USUs that share a common UL timing (control).

[Proposal 10]

In the proposal 9, it is assumed that a UE may (or should) not change mapping between USU ID(s) and USU(s) (e.g., physical antennas/panels (or logical antenna port(s))). It is because a base station can still use previous measurement/configuration for indicating a specific USU for subsequent UL transmissions after MSG1 (and MSG3) transmission. However, in some cases, for example, in the case of PRACH based BFR (PRACH for PCell or the same cell), the measurements performed before MSG1 may not be so useful after MSG1 due to the change of wireless condition (e.g., occurrence of beam or link failure).

In this case, another applicable method is that the UE autonomously changes mapping between USU ID(s) and USU(s) (e.g., physical antennas/panels (or logical antenna port(s))) for MSG1 (and subsequent UL transmissions). Through the above method, the reporting of the USU ID used for MSG1 is not necessary. In this case, changing the mapping between USU ID(s) and USU(s) requires defining a certain rule (e.g., physical antennas/panels (or logical antenna port(s))). That is, the USU ID is pre-defined according to the rule. The USU ID may be an USU ID mapped to a USU used for MSG1 transmission, MSG3 transmission, or subsequent UL transmission until there is an (explicit) USU (and/or panel) indication for changing the USU (and/or panel) for UL transmission from the base station.

For example, a predefined ID (or default ID) may be based on at least one of the following 1) to 4).

1) the lowest USD ID (e.g., ID=0)
2) the USU ID used for most recent uplink transmission
3) the USU ID used for most recent uplink transmission for a specific uplink channel/signal (e.g., PUCCH resource with the lowest ID)
4) the USU ID corresponding to TCI(s) for (the lowest) CORESET(s)

The UE maps/uses the predefined/default USU ID to a USU used for MSG1 transmission. The UE maps/uses the predefined/default USU ID to a USU used for MSG3 transmission and subsequent UL transmission until there is an (explicit) panel indication for changing the panel from the base station. In this case, the base station assumes that the UE will use the predefined/default USU ID.

A rule for mapping of the remaining USU IDs may be defined as follows.

That is, USU ID #x is switched to USU ID #y by a given rule, where x=0, ..., N−1, y=0, ..., N−1, and N is the number of USUs of the UE.

It is described assuming that N is 4, the predefined/default ID is 0, and USU ID of the most recently used/activated USU before the MSG1 transmission is 2. In this case, the USU ID of the most recently used/activated USU may be i) the most recent USU ID used for PUCCH (and/or SRS and/or PUSCH) transmission, or ii) the USU ID corresponding to TCI(s) for (the lowest) CORESET(s). The USU IDs of the respective USUs (e.g., 0,1,2,3) are respectively switched to new USU IDs (e.g., 1,2,0,3) by a predefined rule.

[Proposal 11]

As proposed above, USU information (e.g., USU ID(s)) may be associated to one or multiple PRACH resource(s) (e.g., PRACH occasions and/or preambles). In NR system, each SSB (SS/PBCH block) is associated to one or multiple PRACH resource(s) by a predefined rule. More specifically, an example of the number of SSBs related to one RO (in the case of RACH) may be as follows.

Nssb={1/8, 1/4, 1/2, 1, 2, 4, 8, 16}

If Nssb<1, one SSB is mapped to consecutive ROs, and if Nssb>1, R preambles with consecutive indexes are associated with n SSBs, where 0≤n≤Nssb−1.

The mapping of SSBs to PRACH occasions are performed in following order

1) Preamble indexes within a single RO
2) Frequency resource indexes for frequency multiplexed ROs
3) Time resource indexes for time multiplexed ROs within a PRACH slot
4) Indexes for PRACH slot Within an association period (e.g., 10/20/40/80/160 ms), an integer number of SSBs are cyclically mapped to ROs, and remaining RO(s) within the association period is/are omitted. An association pattern period is one or multiple association period (160 ms).

The association between SSBs and PRACH resources means that a UE can select and transmit a PRACH resource when the associated SSB is preferred (i.e., the quality of the SSB is equal to or greater than a specific threshold, e.g., RSRP-ThresholdSSBlock).

Considering the above structure, the following method may be considered in order to map USU IDs to PRACH resources as much as possible. Specifically, a method may be considered to associate USU IDs with (each) SSB(s) or reuse an existing mapping rule between PRACH resources and SSBs.

The association between USU IDs to (each) SSB(s) may be provided by a base station configuration (e.g., via RRC message). Alternatively, the association may be determined by a predefined rule. For example, if an SSB is associated to K ROs, each USU can be associated with (approximately) K/L RO(s), where L is the total number of USUs for the UE by the base station configuration or by the predefined mapping rule.

For another example, if an SSB is associated with K preambles in one RO, each USU can be associated with K/L preambles, where L is the total number of USUs for the UE by the base station configuration or by the predefined mapping rule.

For another example, the associated USU ID may be changed according to an SSB-RO mapping period (or based on an SSB-RO mapping period). For example, the associated USU ID is unchanged during an association period (e.g., 10/20/40/80/160 ms), but may be changed across multiple association periods. The associated USU ID may be configured/defined by slot/subframe number.

The association information proposed above may be used for the UE to select a PRACH resource (and/or transmit PRACH). The association information may be used when the associated SSB and the associated USU are preferred. The fact that when the associated SSB and the associated USU are preferred may mean that the quality of the SSB associated with the associated/corresponding USU (or Rx panel) is equal to or greater than a specific threshold (e.g., RSRP-ThresholdSSBlock). With this association information, the UE may (implicitly) report/inform the base station about the preferred/used/selected USU (ID) in addition to the preferred/selected SSB ID.

The base station can know which USU ID the UE have used for the PRACH transmission when (correctly) detecting/receiving PRACH preamble. This association information may also be used for the base station to indicate a specific USU ID for PRACH transmission. For example, when the base station selects a PRACH resource (triggers PRACH transmission/indicates PRACH resource to UE) (e.g., PDCCH-ordered PRACH), the indicated PRACH resource may implicitly indicate the USU ID to be used for the PRACH transmission. The UE transmits the PRACH on the indicated PRACH resource based on (or using) the (associated) USU ID (or USU).

[Proposal 12]

Since each USU will be associated to a different set of physical resources (e.g., panels, beams) at a UE, uplink transmission power needs to be controlled independently per USU and TA. For open-loop (and closed-loop) power control, the DL RS associated to each USU (proposal 4) may be used for pathloss estimation for each USU. For the closed-loop power control, a base station/network may command an increase/decrease of UL Tx power per USU. For example, it is assumed that a set of PUSCH/PUCCH DMRS layers (DMRS set #0) is associated to USU #0, and other set of PUSCH/PUCCH DMRS layers (DMRS set #1) is associated to USU #1. The network may have to command the increase or decrease of UL transmission power for a specific DMRS set (e.g., DMRS set #0).

In this regard, the USU information may be provided when a TPC command is provided to the UE. In this case, the USU information may be provided by adding an information field (e.g., USU ID) in a DCI format for a TPC command.

Another signaling option is to use different RNTI per USU for CRC scrambling of the PDCCH containing the TPC command. In this case, the network needs to inform the UE of RNTIs and an association between RNTIs and USU(s) (e.g., TPC-PUCCH-RNTI0 for PUCCH resources in USU #0, TPC-PUCCH-RNTI1 for PUCCH resources in USU #1) (via higher layer signaling).

One RNTI may be associated to multiple USUs. In this case, the multiple USUs share a power control process/parameter. Another way of signaling TPC per USU(s) is to define an extended DCI format for TPC that may indicate multiple TPCs. For example, multiple TPC fields may be defined in a DCI format, wherein each TPC is explicitly mapped to one or multiple USUs via another information field. Or, each TPC is implicitly mapped to one or multiple USUs (e.g., an n-th TPC is mapped to an n-th USU). Alternatively, it is also possible to jointly encode multiple TPCs into one DCI field.

Accordingly, the above-described proposals can be extended and applied to TPC per USU as well as TA per USU.

In other words, a USU may be re-defined as a set of UL RSs/channels that shares a power control process and/or TA value. Depending on implementation, the USU can have different sets of physical resources (e.g., panels) that share power control and physical resources that shares TA. It is because the former one may be more related to whether the power resources share a power amplifier, and the latter one may be more related to a difference in a line delay and a timing calibration capability for the physical resources (e.g., antennas, panels) at a baseband processor.

Accordingly, USU may be defined based on one aspect only, then another information is needed for the UE and the base station to indicate which USUs have commonality/difference on another aspect. For example, USU may be defined from an UL synchronization perspective. In this case, the UE informs the base station about whether which USU(s) shares a power control related process/parameter. And/or, the base station may separately configure, to the UE, whether which USUs share TPC. For a specific TPC command, the network may indicate USU set information instead of USU information to which the TPC command is applied. The base station can control the increase/decrease of Tx power for all panels more frequently than controlling it independently for each panel according to the overall quality of uplink signal. Therefore, it may be more efficient that the indicated Pc value for TPC corresponds to all USUs (for a UL signal/channel) if there is no explicit configuration/indication related to USU information.

In this regard, it is more efficient to use differential Pc value(s) for reducing a signaling overhead. For example, the base station may indicate K Pc values, where the first Pc value is commonly applied to all USUs, and the other (K−1) Pc values correspond to (K−1) USUs (or USU sets), respectively. Here, the (K−1) values are differential values with respect to the first Pc value, referred to as delta-Pc values.

Each of the (K−1) delta-Pc values may be informed as a smaller payload size than the first/reference Pc value. Detailed examples with respect to this are described. It is assumed that a base station wants to command a UE to boost UE's Tx power by X dB for all panels (USUs) except for one specific panel, where the Tx power of the specific panel needs to be boosted by (X−1) dB. In the proposed method, the base station needs to indicate two Pc values, i.e., Pc #0=XdB as the reference Pc and Pc #1=−1 dB as the delta-Pc, where the second Pc may be transferred using a smaller payload (e.g., 1 to 2 bits). In the above example, the USU (set) ID may be accompanied by the delta-Pc value in order to indicate the (set of) USU(s) to which the TPC command is applied.

Another example of using delta-Pc is that the first (or reference) Pc value corresponds to a specific USU, not to all USUs. For example, the initial/default/reference USU defined/configured in the previous proposals may be the specific USU. Alternatively, the specific USU may be pre-configured by the base station or pre-defined by a rule (e.g., the USU with the lowest ID). One specific Pc value for TPC may correspond to a specific USU (e.g., a pre-configured/pre-defined USU), and other Pc values may correspond to the other USUs. Here, the other Pc values may be informed as differential values with respect to the specific Pc value.

The reference/first Pc value and the delta-Pc value may be conveyed on same or different messages, wherein each message may be transmitted on different layers (e.g., one is the physical layer, and the other is MAC sublayer). In this instance, the above transmission may be based on same or different signaling mechanisms (e.g., one is PDCCH CRC scrambling, and the other is a DCI field).

As described above with respect to delta-TA, the differential values of Pc across multiple USUs need to be changed less frequently. Thus, the delta-Pc values can be indicated via higher layer signaling (e.g., MAC-CE) while the TPC command is indicated via physical layer signaling (e.g., DCI).

The above-described proposals may be related to how many TA values should be controlled per CC. In NR, a bandwidth part (BWP) is newly introduced, and each BWP within a CC may have a different numerology (e.g., subcarrier spacing). It is possible to support UEs that can manage multiple BWPs in a CC in the future. Therefore, the TA value needs to be controlled per BWP not per CC. In this case, 'per CC' in the present disclosure may be replaced by 'per BWP' throughout the present disclosure.

In the present disclosure, the proposed term "USU" has been used based on the proposal 1 and for convenience of explanation. However, this term is not to limit the scope of embodiments described in the present disclosure. Specifically, even if 'USU' or the term associated with this is not defined, proposals other than the proposal 1 can be applied. Instead of introducing a new term, 'USU' in the above proposals can be replaced by one or more PRACH resources/preambles/instances, SRS resources/resource sets, PUCCH resources/resource sets, or PUSCH DMRS ports/layers.

In the implementation perspective, the operations of the base station/UE according to the above-described embodiments (e.g., operations related to the transmission of UL signal/the random access procedure based on at least one of the proposals 1 to 12) may be implemented by means of a device of FIGS. 18 to 22 to be described below (e.g., processor (102, 202) in FIG. 19).

In addition, the operations of the base station/UE according to the above-described embodiments (e.g., operations related to the transmission of UL signal/the random access procedure based on at least one of the proposals 1 to 12) may also be stored in a memory (e.g., memories 104 and 204 in FIG. 19) in the form of command/program (e.g., instruction, executable code) for executing at least one processor (e.g., processors 102 and 202 in FIG. 19).

Hereinafter, the above-described embodiments are described in detail in the aspect of the UE's operation with reference to FIG. 16. Methods to be described below are merely distinguished for convenience of explanation, and it is a matter of course that partial configuration of any one method is replaced by partial configuration of other methods, or these methods are combined with each other and applied.

FIG. 16 is a flow chart illustrating a method for a UE to perform a random access procedure in a wireless communication system according to an embodiment of the present disclosure.

Referring to FIG. 16, a method for a UE to perform a random access procedure in a wireless communication system according to an embodiment of the present disclosure may comprise a step S1610 of transmitting a PRACH preamble and a step S1620 of receiving a random access response (RAR).

In the step S1610, the UE transmits a physical random access channel (PRACH) preamble to a base station. The PRACH preamble may be based on a contention-based RACH procedure (CBRA) or a contention-free RACH procedure (CFRA).

According to an embodiment, the PRACH preamble may be transmitted based on a specific unit. The specific unit may be an uplink (UL) synchronization unit (USU) based on one of the proposals 1 to 12.

The specific unit may be based on one of i) at least one beam, ii) at least one panel of a plurality of panels of the UE, or iii) at least one antenna port related to the at least one panel.

According to an embodiment, the specific unit may be related to a common property. The common property may include at least one of a timing advance (TA) or a transmission power control (TPC).

The common property may be related to a specific frequency domain. The specific frequency domain may be based on a component carrier (CC) or a bandwidth part (BWP). This embodiment may be based on at least one of the proposal 1 or 12.

According to an embodiment, based on that the PRACH preamble is associated with a plurality of specific units (e.g., a plurality of USUs), the specific unit for a transmission of the PRACH preamble may be determined based on association information.

For example, the association information may be based on an ID of the specific unit or mapping information between the specific unit and a radio network temporary identifier (RNTI).

As another example, the association information may be related to at least one downlink reference signal (DLRS) associated with the plurality of specific units.

This embodiment may be based on at least one of the proposals 2 to 4. The ID of the specific unit may be an USU ID. The mapping information may represent an RNTI per USU.

According to the step S1610 described above, an operation for the UE (100/200 in FIGS. 18 to 22) to transmit a physical random access channel (PRACH) preamble to the base station (100/200 in FIGS. 18 to 22) may be implemented by a device of FIGS. 18 to 22. For example, referring to FIG. 19, one or more processors 102 may control one or more transceivers 106 and/or one or more memories 104 to transmit the physical random access channel (PRACH) preamble to a base station 200.

In the step S1620, the UE receives a random access response (RAR) from the base station. The RAR may be based on a contention-based RACH procedure or a contention-free RACH procedure.

According to the step S1620 described above, an operation for the UE (100/200 in FIGS. 18 to 22) to receive a random access response (RAR) from the base station (100/200 in FIGS. 18 to 22) may be implemented by a device of FIGS. 18 to 22. For example, referring to FIG. 19, one or more processors 102 may control one or more transceivers 106 and/or one or more memories 104 to receive a random access response (RAR) from the base station 200.

The method may further comprise a step of transmitting UE capability information before the step S1610 or after the step S1620.

In the step of transmitting the UE capability information, the UE transmits the UE capability information to the base station. The UE capability information may be related to a number of the specific units. The number of the specific units may be based on at least one of a total number (N) of the specific units or a maximum number (M) of the specific units that are able to be simultaneously applied. This embodiment may be based on the proposal 2.

The PRACH preamble may be transmitted based on the M specific units. This is to improve coverage and reliability by utilizing all the specific units (e.g., USUs), that are able to be simultaneously applied, in transmission of the PRACH preamble. This embodiment may be based on the proposal 4.

According to the above-described step, an operation for the UE (100/200 in FIGS. 18 to 22) to transmit the UE capability information to the base station (100/200 in FIGS. 18 to 22) may be implemented by a device of FIGS. 18 to 22. For example, referring to FIG. 19, one or more processors 102 may control one or more transceivers 106 and/or one or more memories 104 to transmit the UE capability information to the base station 200.

The method according to an embodiment may be based on a contention-based RACH procedure (CBRA). Specifically, the method may further comprise a step of transmitting a third message (Msg3) and a step of receiving a contention resolution message.

In the step of transmitting the third message, the UE transmits the third message (Msg3) to the base station based on the RAR. The Msg3 may be transmitted based on the specific unit (e.g., USU).

According to the above-described step, an operation for the UE (100/200 in FIGS. 18 to 22) to transmit the third message (Msg3) to the base station (100/200 in FIGS. 18 to 22) based on the RAR may be implemented by a device of FIGS. 18 to 22. For example, referring to FIG. 19, one or more processors 102 may control one or more transceivers 106 and/or one or more memories 104 to transmit the third message (Msg3) to the base station 200 based on the RAR.

In the step of receiving the contention resolution message, the UE may receive the contention resolution message (Msg4) from the base station.

According to the above-described step, an operation for the UE (100/200 in FIGS. 18 to 22) to receive the contention resolution message (Msg4) from the base station (100/200 in FIGS. 18 to 22) may be implemented by a device of FIGS. 18 to 22. For example, referring to FIG. 19, one or more processors 102 may control one or more transceivers 106 and/or one or more memories 104 to receive the contention resolution message (Msg4) from the base station 200.

According to an embodiment, the PRACH preamble may be based on a plurality of PRACH preambles. The RAR may include one TA value of a plurality of TA values for the plurality of PRACH preambles. The Msg4 may include information for remaining TA values except for the TA value included in the RAR among the plurality of TA values. This embodiment may be based on the proposal 5.

For example, the TA value included in the RAR may be based on at least one of i) a TA value applied to a transmission of the Msg3, ii) a TA value for one of a plurality of specific units for the plurality of PRACH preambles, or iii) a reference TA value for the remaining TA values.

For example, the TA values included in the Msg4 may be a differential value with respect to the TA value included in the RAR.

According to an embodiment, the plurality of TA values may be adjusted by the same value based on a pre-configured command. The pre-configured command may be a TA adjustment command based on the proposal 6.

According to an embodiment, the PRACH preamble may be based on a plurality of PRACH preambles, and the Msg3 may include information related to a specific event. The specific event may be related to a configuration of a plurality of temporary cell-radio network temporary identifiers (TC-RNTIs). This embodiment may be based on at least one of the proposals 7 and 8.

According to an embodiment, the PRACH preamble or the Msg3 may include an ID of the specific unit used for a transmission of the PRACH preamble (e.g., USU ID). This embodiment may be based on at least one of the proposals 9 to 11.

The ID of the specific unit may be based on a default ID of the proposal 10.

Specifically, the default ID may be related to at least one of:

1) a specific unit of a lowest index;
2) a specific unit used for a most recent uplink transmission;
3) a specific unit used for a most recent uplink transmission for a specific uplink channel; and
4) a specific unit related to a transmission configuration indicator (TCI) of a lowest control resource element (CORESET).

The ID of the specific unit may be determined based on a mapping period between a SS block (SSB) and a RACH occasion (RO). A quality of the panel and a quality of the SSB depending on the ID of the specific unit may be equal to or greater than a specific value. the specific value may be a specific threshold (RSRP-ThresholdSSBlock) of the proposal 11.

Hereinafter, the above-described embodiments are described in detail in the aspect of the base station's operation with reference to FIG. 17. Methods to be described below are merely distinguished for convenience of explanation, and it is a matter of course that partial configuration of any one method is replaced by partial configuration of other methods, or these methods are combined with each other and applied.

FIG. 17 is a flow chart illustrating a method for a base station to perform a random access procedure in a wireless communication system according to another embodiment of the present disclosure.

Referring to FIG. 17, a method for a base station to perform a random access procedure in a wireless communication system according to another embodiment of the present disclosure may comprise a step S1710 of receiving a PRACH preamble and a step S1720 of transmitting a random access response (RAR).

In the step S1710, the base station receives a physical random access channel (PRACH) preamble from a UE. The PRACH preamble may be based on a contention-based RACH procedure (CBRA) or a contention-free RACH procedure (CFRA).

According to an embodiment, the PRACH preamble may be transmitted based on a specific unit. The specific unit may be an uplink (UL) synchronization unit (USU) based on one of the proposals 1 to 12.

The specific unit may be based on one of i) at least one beam, ii) at least one panel of a plurality of panels of the base station, or iii) at least one antenna port related to the at least one panel.

According to an embodiment, the specific unit may be related to a common property. The common property may include at least one of a timing advance (TA) or a transmission power control (TPC).

The common property may be related to a specific frequency domain. The specific frequency domain may be based on a component carrier (CC) or a bandwidth part (BWP). This embodiment may be based on at least one of the proposal 1 or 12.

According to an embodiment, based on that the PRACH preamble is associated with a plurality of specific units (e.g., a plurality of USUs), the specific unit for a reception of the PRACH preamble may be determined based on association information.

For example, the association information may be based on an ID of the specific unit or mapping information between the specific unit and a radio network temporary identifier (RNTI).

As another example, the association information may be related to at least one downlink reference signal (DLRS) associated with the plurality of specific units.

This embodiment may be based on at least one of the proposals 2 to 4. The ID of the specific unit may be an USU ID. The mapping information may represent an RNTI per USU.

According to the step S1710 described above, an operation for the base station (100/200 in FIGS. 18 to 22) to receive a physical random access channel (PRACH) preamble from the UE (100/200 in FIGS. 18 to 22) may be implemented by a device of FIGS. 18 to 22. For example, referring to FIG. 19, one or more processors 202 may control one or more transceivers 206 and/or one or more memories 204 to receive the physical random access channel (PRACH) preamble from the UE 100.

In the step S1720, the base station transmits a random access response (RAR) to the UE. The RAR may be based on a contention-based RACH procedure (CBRA) or a contention-free RACH procedure (CFRA).

According to the step S1720 described above, an operation for the base station (100/200 in FIGS. 18 to 22) to transmit a random access response (RAR) to the UE (100/200 in FIGS. 18 to 22) may be implemented by a device of FIGS. 18 to 22. For example, referring to FIG. 19, one or more processors 202 may control one or more transceivers 206 and/or one or more memories 204 to transmit a random access response (RAR) to the UE 100.

The method may further comprise a step of receiving UE capability information before the step S1710 or after the step S1720.

In the step of receiving the UE capability information, the base station receives the UE capability information from the UE. The UE capability information may be related to a number of the specific units. The number of the specific units may be based on at least one of a total number (N) of the specific units or a maximum number (M) of the specific units that are able to be simultaneously applied. This embodiment may be based on the proposal 2.

The PRACH preamble may be transmitted based on the M specific units. This is to improve coverage and reliability by utilizing all the specific units (e.g., USUs), that are able to be simultaneously applied, in the reception of the PRACH preamble. This embodiment may be based on the proposal 4.

According to the above-described step, an operation for the base station (100/200 in FIGS. 18 to 22) to receive the UE capability information from the UE (100/200 in FIGS. 18 to 22) may be implemented by a device of FIGS. 18 to 22. For example, referring to FIG. 19, one or more processors 202 may control one or more transceivers 206 and/or one or more memories 204 to receive the UE capability information from the UE 100.

The method according to an embodiment may be based on a contention-based RACH procedure (CBRA). Specifically, the method may further comprise a step of receiving a third message (Msg3) and a step of transmitting a contention resolution message.

In the step of receiving the third message, the base station receives the third message (Msg3) from the UE based on the RAR. The Msg3 may be transmitted based on the specific unit (e.g., USU).

According to the above-described step, an operation for the base station (100/200 in FIGS. 18 to 22) to receive the third message (Msg3) from the UE (100/200 in FIGS. 18 to 22) based on the RAR may be implemented by a device of FIGS. 18 to 22. For example, referring to FIG. 19, one or more processors 202 may control one or more transceivers 206 and/or one or more memories 204 to receive the third message (Msg3) from the UE 100 based on the RAR.

In the step of transmitting the contention resolution message, the base station may transmit the contention resolution message (Msg4) to the UE.

According to the above-described step, an operation for the base station (100/200 in FIGS. 18 to 22) to transmit the contention resolution message (Msg4) to the UE (100/200 in FIGS. 18 to 22) may be implemented by a device of FIGS. 18 to 22. For example, referring to FIG. 19, one or more processors 202 may control one or more transceivers 206 and/or one or more memories 204 to transmit the contention resolution message (Msg4) to the UE 100.

According to an embodiment, the PRACH preamble may be based on a plurality of PRACH preambles. The RAR may include one TA value of a plurality of TA values for the plurality of PRACH preambles. The Msg4 may include information for remaining TA values except for the TA value included in the RAR among the plurality of TA values. This embodiment may be based on the proposal 5.

For example, the TA value included in the RAR may be based on at least one of i) a TA value applied to a reception of the Msg3, ii) a TA value for one of a plurality of specific units for the plurality of PRACH preambles, or iii) a reference TA value for the remaining TA values.

For example, the TA values included in the Msg4 may be a differential value with respect to the TA value included in the RAR.

According to an embodiment, the plurality of TA values may be adjusted by the same value based on a pre-configured command. The pre-configured command may be a TA adjustment command based on the proposal 6.

According to an embodiment, the PRACH preamble may be based on a plurality of PRACH preambles, and the Msg3 may include information related to a specific event. The specific event may be related to a configuration of a plurality of temporary cell-radio network temporary identifiers (TC-RNTIs). This embodiment may be based on at least one of the proposals 7 and 8.

According to an embodiment, the PRACH preamble or the Msg3 may include an ID of the specific unit used for a transmission of the PRACH preamble (e.g., USU ID). This embodiment may be based on at least one of the proposals 9 to 11.

The ID of the specific unit may be based on a default ID of the proposal 10.

Specifically, the default ID may be related to at least one of:
1) a specific unit of a lowest index;
2) a specific unit used for a most recent uplink transmission;
3) a specific unit used for a most recent uplink transmission for a specific uplink channel; and
4) a specific unit related to a transmission configuration indicator (TCI) of a lowest control resource element (CORESET).

The ID of the specific unit may be determined based on a mapping period between a SS block (SSB) and a RACH occasion (RO). A quality of the panel and a quality of the SSB depending on the ID of the specific unit may be equal to or greater than a specific value. the specific value may be a specific threshold (RSRP-ThresholdSSBlock) of the proposal 11.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 18 illustrates a communication system 1 applied to the present disclosure.

Referring to FIG. 18, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HIVID), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure.

FIG. 19 illustrates wireless devices applicable to the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

Figure 20:
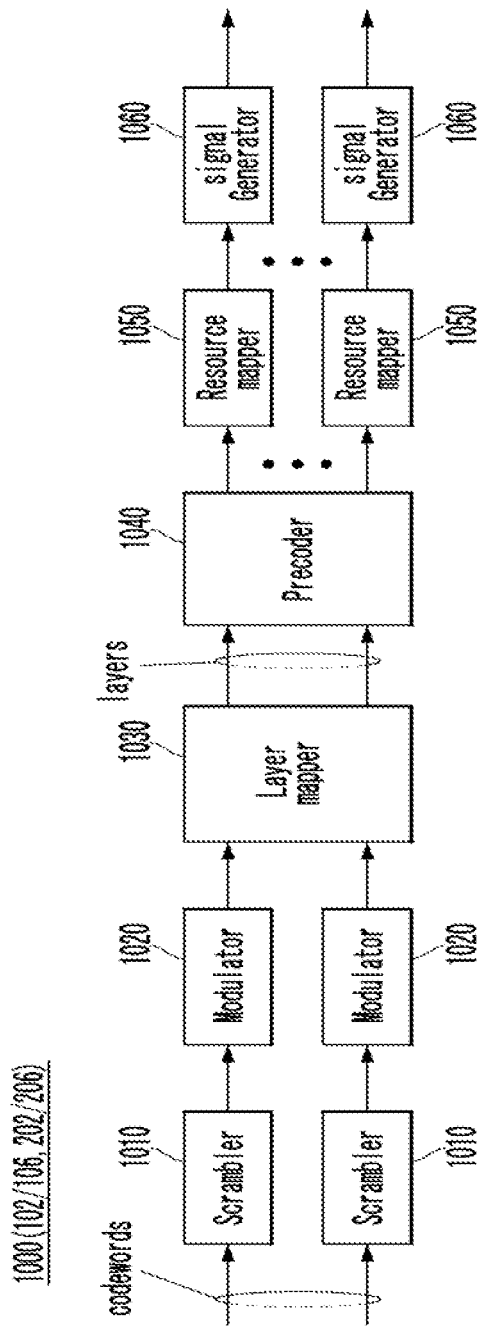
FIG. 20 illustrates a signal process circuit for a transmission signal.

FIG. 20 illustrates a signal process circuit for a transmission signal.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 21 illustrates another example of a wireless device applied to the present disclosure.

The wireless device may be implemented in various forms according to a use-case/service (refer to FIG. 18). Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 22 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of a method of performing a random access procedure and a device thereof in a wireless communication system according to embodiments of the present disclosure are described as follows.

According to an embodiment of the present disclosure, a physical random access channel (PRACH) preamble is transmitted based on a specific unit related to a common property. The specific unit may be based on one of i) at least one beam, ii) at least one of a plurality of panels of a UE, or iii) at least one antenna port related to the at least one panel. That is, a random access procedure is performed based on the panel/beam/antenna port having the common property.

Accordingly, a random access procedure of a multi-panel UE can be performed so that a difference in channel property between the panels and a difference in other properties are minimized, and thus reliability of the procedure can be secured.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method of performing, by a user equipment (UE), a random access procedure in a wireless communication system, the method comprising:
   transmitting a physical random access channel (PRACH) preamble among a plurality of PRACH preambles;
   receiving a random access response (RAR) including one timing advance (TA) value among a plurality of TA values for the plurality of PRACH preambles;
   transmitting a third message (Msg3) based on the RAR; and
   receiving a contention resolution message (Msg4) including information for remaining TA values except for the TA value included in the RAR among the plurality of TA values,
   wherein the PRACH preamble and the Msg3 are transmitted based on a specific unit which is an uplink synchronization unit corresponding to at least one of a PRACH resource, a sounding reference signal (SRS) resource, or a physical uplink control channel (PUCCH) resource set, wherein the specific unit is based on one of i) at least one beam, ii) at least one panel of a plurality of panels of the UE, or iii) at least one antenna port related to the at least one panel, and wherein the specific unit is related to a common property including a TA.

2. The method of claim 1, wherein the common property is related to a specific frequency domain, and wherein the specific frequency domain is based on a component carrier (CC) or a bandwidth part (BWP).

3. The method of claim 1, further comprising:

transmitting UE capability information, wherein the UE capability information is related to a number of the specific units, and wherein the number of the specific units is based on at least one of a total number (N) of the specific units or a maximum number (M) of the specific units that are able to be simultaneously applied.

4. The method of claim 1, wherein, based on that the PRACH preamble is associated with a plurality of specific units, the specific unit for a transmission of the PRACH preamble is determined based on association information, and wherein the association information is based on an ID of the specific unit or mapping information between the specific unit and a radio network temporary identifier (RNTI).

5. The method of claim 1, wherein, based on that the PRACH preamble is associated with a plurality of specific units, the specific unit for a transmission of the PRACH preamble is determined based on association information, and wherein the association information is related to at least one downlink reference signal (DLRS) associated with the plurality of specific units.

6. The method of claim 3, wherein the PRACH preamble is transmitted based on the M specific units.

7. The method of claim 1, wherein the TA value included in the RAR is based on at least one of i) a TA value applied to a transmission of the Msg3, ii) a TA value for one of a plurality of specific units for the plurality of PRACH preambles, or iii) a reference TA value for the remaining TA values.

8. The method of claim 1, wherein the TA values included in the Msg4 are a differential value with respect to the TA value included in the RAR.

9. The method of claim 1, wherein the plurality of TA values are adjusted by the same value based on a pre-configured command.

10. The method of claim 1, wherein the PRACH preamble is based on a plurality of PRACH preambles, wherein the Msg3 includes information related to a specific event, and wherein the specific event is related to a configuration of a plurality of temporary cell-radio network temporary identifiers (TC-RNTIs).

11. The method of claim 1, wherein the PRACH preamble or the Msg3 includes an ID of the specific unit used for a transmission of the PRACH preamble.

12. The method of claim 11, wherein the ID of the specific unit is based on a default ID, and wherein the default ID is related to at least one of 1) a specific unit of a lowest index, 2) a specific unit used for a most recent uplink transmission, 3) a specific unit used for a most recent uplink transmission for a specific uplink channel, and 4) a specific unit related to a transmission configuration indicator (TCI) of a lowest control resource element (CORESET).

13. The method of claim 11, wherein the ID of the specific unit is determined based on a mapping period between a SS block (SSB) and a RACH occasion (RO).

14. The method of claim 13, wherein a quality of the panel and a quality of the SSB depending on the ID of the specific unit are equal to or greater than a specific value.

15. A user equipment (UE) performing a random access procedure in a wireless communication system, the UE comprising:

one or more transceivers;

one or more processors; and one or more memories operatively connected to the one or more processors and storing instructions that, when executed by the one or more processors, configure the one or more processors to perform operations, wherein the operations comprise:

transmitting a physical random access channel (PRACH) preamble among a plurality of PRACH preambles;

receiving a random access response (RAR) including one timing advance (TA) value among a plurality of TA values for the plurality of PRACH preambles;

transmitting a third message (Msg3) based on the RAR; and receiving a contention resolution message (Msg4) including information for remaining TA values except for the TA value included in the RAR among the plurality of TA values, wherein the PRACH preamble and the Msg3 are transmitted based on a specific unit which is an uplink synchronization unit corresponding to at least one of a PRACH resource, a sounding reference signal (SRS) resource, or a physical uplink control channel (PUCCH) resource set, wherein the specific unit is based on one of i) at least one beam, ii) at least one panel of a plurality of panels of the UE, or iii) at least one antenna port related to the at least one panel, and wherein the specific unit is related to a common property including a TA.

16. One or more non-transitory computer readable mediums (CRMs) storing one or more commands, wherein the one or more commands, when executed by one or more processors, configure the one or more processors to perform operations comprising:

transmit a physical random access channel (PRACH) preamble among a plurality of PRACH preambles;

receive a random access response (RAR) including one timing advance (TA) value among a plurality of TA values for the plurality of PRACH preambles;

transmitting a third message (Msg3) based on the RAR; and receiving a contention resolution message (Msg4) including information for remaining TA values except for the TA value included in the RAR among the plurality of TA values, wherein the PRACH preamble and the Msg3 are transmitted based on a specific unit which is an uplink synchronization unit corresponding to at least one of a PRACH resource, a sounding reference signal (SRS) resource, or a physical uplink control channel (PUCCH) resource set, wherein the specific unit is based on one of i) at least one beam, ii) at least one panel of a plurality of panels, or iii) at least one antenna port related to the at least one panel, and wherein the specific unit is related to a common property including a TA.

* * * * *